US012626089B2

(12) United States Patent
Kim et al.

(10) Patent No.: US 12,626,089 B2
(45) Date of Patent: May 12, 2026

(54) DEVICE AND METHOD WITH MULTIDIMENSIONAL VECTOR NEURAL NETWORK

(71) Applicant: Samsung Electronics Co., Ltd., Suwon-si (KR)

(72) Inventors: Hyunsoo Kim, Yongin-si (KR); Sungmeen Myung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1137 days.

(21) Appl. No.: 17/591,114

(22) Filed: Feb. 2, 2022

(65) Prior Publication Data

US 2022/0358345 A1 Nov. 10, 2022

(30) Foreign Application Priority Data

May 10, 2021 (KR) ........................ 10-2021-0060126

(51) Int. Cl.
*G06N 3/04* (2023.01)
(52) U.S. Cl.
CPC ..................................... *G06N 3/04* (2013.01)
(58) Field of Classification Search
CPC ....................................................... G06N 3/04
See application file for complete search history.

(56) References Cited

U.S. PATENT DOCUMENTS 5,430,830 A * 7/1995 Frank ....................... G06N 3/08
706/41
6,675,187 B1 1/2004 Greenberger 8,924,455 B1 12/2014 Barman et al.
9,104,510 B1 8/2015 Rub et al.
2007/0078661 A1 4/2007 Sriram et al.
2013/0028004 A1 1/2013 Snider
2020/0082254 A1 3/2020 Dally et al.
(Continued)

FOREIGN PATENT DOCUMENTS

KR 10-2019-0029406 A 3/2019
KR 10-2021-0000987 A 1/2021

OTHER PUBLICATIONS

Ni, L., "In-memory computing by RRAM for machine learning" Doctoral thesis, Nanyang Technological University, Singapore., Dec. 11, 2017 (154 pages in English).
(Continued)

*Primary Examiner* — Michael D. Yaary
(74) *Attorney, Agent, or Firm* — NSIP Law

(57) ABSTRACT

A computing device for a multidimensional vector neural network includes: input lines to which multidimensional input vectors are input; output lines intersecting the input lines; memory cells disposed at intersecting points between the input lines and the output lines and configured to store weight elements included in multidimensional weight vectors; selectors configured to transmit a value output from each of the output lines to any one of adders; and the adders configured to accumulate values received from the selectors in a predetermined number of cycles, wherein, for each of the multidimensional weight vectors, weight elements included in the multidimensional weight vector are stored in reference memory cells that connect a corresponding single reference input line and corresponding two or more reference output lines.

20 Claims, 19 Drawing Sheets

(56) References Cited

U.S. PATENT DOCUMENTS

| | | | |
|---|---|---|---|
| 2020/0285950 A1* | 9/2020 | Baum | G06N 3/04 |
| 2020/0411091 A1 | 12/2020 | Hwang | |
| 2021/0303266 A1 | 9/2021 | Myung et al. | |
| 2022/0019884 A1 | 1/2022 | Jung et al. | |
| 2022/0051717 A1 | 2/2022 | Lee et al. | |

OTHER PUBLICATIONS

Extended European search report issued on Oct. 13, 2022, in counterpart European Patent Application No. 22172516.1 (10 pages in English).

Hirose, Akira "Complex-valued neural networks: Advances and applications" *IEE Computational Intelligence Magazine*, Gouhel Tanaka, The University of Tokyo, Japan, vol. 18, John Wiley & Sons, Apr. 11, 2013 pp. 77-79.

Gaudet, Chase J., et al. "Deep Quaternion Networks." *International Joint Conference on Neural Networks* arXiv:1712.04604v3 Jul. 29, 2018 (8 pages in English).

Hayakawa, Daichi, et al. "Applying Complex-Valued Neural Networks to Acoustic Modeling for Speech Recognition." *Asia-Pacific Signal and Information Processing Association Annual Summit and Conference, IEEE Xplore*, Nov. 12-15, 2018 pp. 1725-1731.

Zhu, Xuanyu, et al. "Quaternion Convolutional Neural Networks." *Proceedings of the European Conference on Computer Vision* arXiv:1903.00658v1 Mar. 2, 2018 (17 pages in English).

Sun, Sheng-Yang, et al. "Cascaded architecture for memristor crossbar array based larger-scale neuromorphic computing." *IEEE Access* 7 (2019): 61679-61688.

Ranjan, Ashish, et al. "X-MANN: A Crossbar based Architecture for Memory Augmented Neural Networks." *Proceedings of the 56th Annual Design Automation Conference* 2019 (6 pages in English).

Kim, Guhyun, et al. "Artificial Neural Network for Response Inference of a Nonvolatile Resistance-Switch Array" *Micromachines* vol. 10 Issue 4, Mar. 27, 2019 (8 pages in English).

Pavllo, Dario, et al. "Modeling Human Motion with Quaternion-based Neural Networks." *International Journal of Computer Vision* vol. 128 Issue 4 arXiv:1901.07677v2 Oct. 26, 2019 (18 pages in English).

García-Retuerta, David, et al. "Quaternion Neural Networks: State-of-the-Art and Research Challenges." *International Conference on Intelligent Data Engineering and Automated Learning. Springer, Cham*, 2020 pp. 456-467.

Cho, Hyun-Woong, et al. "Deep Complex-Valued Network for Ego-Velocity Estimation with Millimeter-Wave Radar." *IEEE Sensors*, 2020 (4 pages in English).

Nandakumar, S. R., et al. "Mixed-Precision Deep Learning Based on Computational Memory." *Frontiers in neuroscience*, vol. 14, Article 406, May 2020 (17 pages in English).

Lee, Sung-Tae, et al. "Neuromorphic Computing Using NAND Flash Memory Architecture With Pulse Width Modulation Scheme." *Frontiers in Neuroscience*, vol. 14, Article 571292 Sep. 2020 (10 pages in English).

Chen, Jia, et al. "Multiply accumulate operations in memristor crossbar arrays for analog computing." *Journal of Semiconductors* vol. 42 Article 013104 2021 (23 pages in English).

Korean Office Action issued on Apr. 28, 2025, in corresponding Korean Patent Application No. 10-2021-0060126. (3 pages in English, 5 pages in Korean).

* cited by examiner

DEVICE AND METHOD WITH MULTIDIMENSIONAL VECTOR NEURAL NETWORK

CROSS-REFERENCE TO RELATED APPLICATIONS

This application claims the benefit under 35 USC § 119(a) of Korean Patent Application No. 10-2021-0060126, filed on May 10, 2021 in the Korean Intellectual Property Office, the entire disclosure of which is incorporated herein by reference for all purposes.

BACKGROUND

1. Field

The following description relates to a device and method with a multidimensional vector neural network.

2. Description of Related Art

A neuromorphic processor may perform neural network operations. For example, a neuromorphic processor including a neural circuit and a synaptic circuit may be implemented. Such a neuromorphic processor may be used as a neural network device for driving various neural networks, such as a convolutional neural network (CNN), a recurrent neural network (RNN), a feedforward neural network (FNN), and the like, and may be utilized in various fields including data classification and image recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computing device for a multidimensional vector neural network includes: input lines to which multidimensional input vectors are input; output lines intersecting the input lines; memory cells disposed at intersecting points between the input lines and the output lines and configured to store weight elements included in multidimensional weight vectors; selectors configured to transmit a value output from each of the output lines to any one of adders; and the adders configured to accumulate values received from the selectors in a predetermined number of cycles, wherein, for each of the multidimensional weight vectors, weight elements included in the multidimensional weight vector are stored in reference memory cells that connect a corresponding single reference input line and corresponding two or more reference output lines.

For each of the multidimensional input vectors, input elements included in the multidimensional input vector may be sequentially input to a same reference input line in the cycles.

The predetermined number of cycles may be equal to a number of input elements included in each of the multidimensional input vectors.

For each of multidimensional output vectors, output elements included in the multidimensional output vector may be determined based on a value accumulated by each of reference adders corresponding to the reference output lines.

Reference selectors corresponding to the reference output lines among the selectors may be configured to sort a value output from each of the reference output lines by output elements of each of the multidimensional output vectors and transmit the sorted value to different reference adders.

A number of output lines may be determined based on a number of multidimensional weight vectors and a number of weight elements included in each of the multidimensional weight vectors.

For each of the multidimensional weight vectors, the weight elements included in the multidimensional weight vector may be stored in reference memory cells connected to different reference output lines.

The multidimensional input vectors, the multidimensional weight vectors, and multidimensional output vectors determined based on a value accumulated by each of the adders may be complex vectors comprising a real element and an imaginary element.

A value output from a first reference output line connected to memory cells configured to store real elements among the reference output lines may be transmitted to a second reference adder configured to accumulate imaginary elements, wherein a sign of the value may be maintained through a first reference selector, and another value output from a second reference output line connected to memory cells configured to store imaginary elements among the reference output lines may be transmitted to a first reference adder configured to accumulate real elements, wherein a sign of the other value may be inverted through a second reference selector.

The multidimensional input vectors, the multidimensional weight vectors, and multidimensional output vectors determined based on a value accumulated by each of the adders may be either one or both of quaternion vectors comprising imaginary elements and quaternion vectors comprising a real element and imaginary elements.

The device may include second selectors configured to determine a sign of a value output from each of the output lines based on a type of a multidimensional weight vector applied to an operation to be performed in each cycle, a type of a weight element stored in the memory cells, and a type of an input element input to the input lines and transmit the value with the determined sign to a corresponding selector.

Elements included in each of partial operation result vectors accumulated by the adders in a portion of the cycles may be sequentially input to the input lines in the remaining portion of the cycles.

The predetermined number of cycles may be "2" in response to the multidimensional weight vectors being complex vectors, and "7" or "8" in response to the multidimensional weight vectors being quaternion vectors.

In another general aspect, a processor-implemented operation method of a computing device for a multidimensional vector neural network includes: inputting input elements included in each of multidimensional input vectors to input lines; transmitting, through selectors, a value output from each of output lines intersecting the input lines to any one of adders; and accumulating, through the adders, values received from the selectors in a predetermined number of cycles, wherein, for each of the multidimensional weight vectors applied to the multidimensional vector neural network, weight elements included in the multidimensional weight vector may be stored in reference memory cells that connect a corresponding single reference input line and corresponding two or more reference output lines.

For each of the multidimensional input vectors, the inputting may include sequentially inputting input elements included in the multidimensional input vector to a same reference input line in the cycles.

The predetermined number of cycles may be equal to a number of input elements included in each of the multidimensional input vectors.

For each of multidimensional output vectors, output elements included in the multidimensional output vector may be determined based on a value accumulated by each of reference adders corresponding to the reference output lines.

The transmitting may include sorting, through reference selectors corresponding to the reference output lines among the selectors, a value output from each of the reference output lines by output elements of each of the multidimensional output vectors and transmitting the sorted value to different reference adders.

A number of output lines may be determined based on a number of multidimensional weight vectors and a number of weight elements included in each of the multidimensional weight vectors.

For each of the multidimensional weight vectors, the weight elements included in the multidimensional weight vector may be stored in reference memory cells connected to different reference output lines.

In another general aspect, a computing device for a multidimensional vector neural network includes: memory cells of an input line each configured to store a corresponding element of a multidimensional weight vector, and to generate an output to a corresponding output line based on an input; selectors each configured to select, based on a cycle, any one of adders and to transmit an operation result of a corresponding output line to the selected adder; and the adders each configured to accumulate, through a plurality of cycles, operation results received from the selectors.

Three adders may be configured to generate an intermediate operation vector by the accumulating of the operation results, and the memory cells may be further configured to generate an output to a corresponding output line based on an input of the intermediate operation vector.

For the generating of the output based on the input of the intermediate operation vector, each of a plurality of the memory cells may be configured to store an element of a conjugate of the multidimensional weight vector, wherein elements of the conjugate have opposite signs of elements of the multidimensional weight vector.

A selector of the selectors may be configured to select an adder in a first cycle and another adder in another cycle.

In the cycle, each selector may select a different one of the adders.

For the transmitting of the operation result, a first selector may be configured to transmit an operation result of a first output line to a first adder in a first cycle and to a second adder in a second cycle, and a second selector may be configured to transmit an operation result of a second output line to a second adder in the first cycle and to the first adder in the second cycle.

In another general aspect, a computing device for a multidimensional vector neural network includes: first memory cells of a first output line configured to store first elements of multidimensional weight vectors and to generate a first operation result based on a multidimensional input vector; a first selector configured transmit the first operation result to a first adder in a first cycle and to a second adder in a second cycle; second memory cells of a second output line configured to store second elements of the multidimensional weight vectors and to generate a second operation result based on the multidimensional input vector; a second selector configured transmit the second operation result to the second adder in the first cycle and to the first adder in the second cycle; and the first adder and the second adder each configured to accumulate, through the first and second cycles, received operation results.

The multidimensional weight vectors may be complex vectors, the first elements may be real elements, and the second elements may be imaginary elements.

Other features and aspects will be apparent from the following detailed description, the drawings, and the claims.

Figure 1:
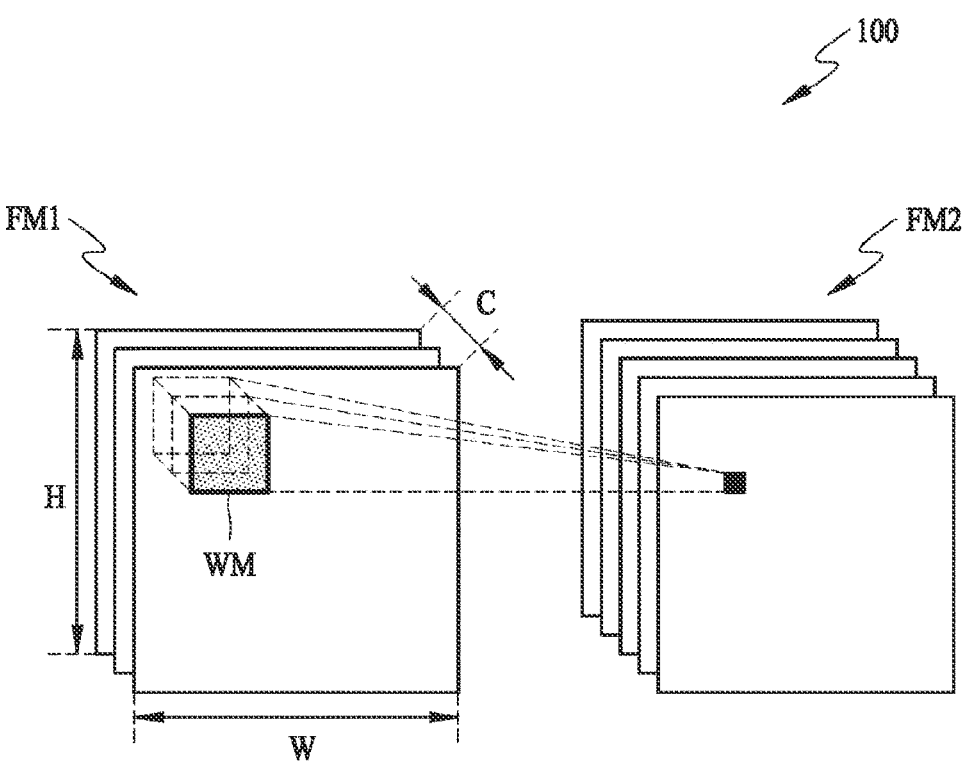
FIG. 1 illustrates an example of an architecture of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an architecture of a neural network.

A neural network 100 may be expressed as a mathematical model using nodes and edges. The neural network 100 may be an architecture of a deep neural network (DNN) or an n-layer neural network. The DNN or the n-layer neural network may correspond to a convolutional neural network (CNN), a recurrent neural network (RNN), a deep belief network, and/or a restricted Boltzmann machine. For example, the neural network 100 may be implemented as a CNN. However, examples are not limited thereto. In FIG. 1, the neural network 100 may correspond to a portion of layers in a CNN. Accordingly, the neural network 100 may correspond to a convolutional layer, a pooling layer, and a fully connected layer in the CNN. However, for ease of description, the neural network 100 may correspond to a convolutional layer in the CNN in the following description.

In the convolutional layer, a first feature map (FM1) may correspond to an input feature map, and a second feature map (FM2) may correspond to an output feature map. For example, the first feature map FM1 may be a data set expressing various features of input data, and the second feature map FM2 may be a data set expressing various features of output data resulting from convolution operations being performed by applying a weight map WM to the first feature map FM1. The feature maps FM1 and FM2 may be two-dimensional or higher-dimensional matrices and have respective activation parameters. When the feature maps FM1 and FM2 correspond to, for example, three-dimensional feature maps, the feature maps FM1 and FM2 have a width W (or referred to as a column), a height H (or referred to as a row), and a depth C. In this case, the depth C may correspond to the number of channels.

The convolution operation performed on the first feature map FM1 and the weight map WM to generate the second feature map FM2, the weight map WM may be used to filter the first feature map FM1 and may be referred to as a weight filter or a weight kernel. In an example, the depth (e.g., the number of channels) of the weight map WM may be equal to the depth (e.g., the number of channels) of the first feature map FM1. The weight map WM may be shifted in a manner of traversing the first feature map FM1 as a sliding window. During each shift, each of the weights included in the weight map WM may be multiplied by and added to all feature values in an area overlapping the first feature map FM1. In response to the convolution between the first feature map FM1 and the weight map WM, one channel of the second feature map FM2 may be generated.

Although FIG. 1 shows a single weight map WM, convolution operations between the first feature map FM1 and a plurality of weight maps may be performed to generate channels of the second feature map FM2. Meanwhile, the second feature map FM2 of the convolutional layer may be an input feature map for a subsequent layer. For example, the second feature map FM2 may be an input feature map for the pooling layer, or the second feature map FM2 may be an input feature map of a subsequent convolutional layer. However, examples are not limited thereto.

Figure 2:
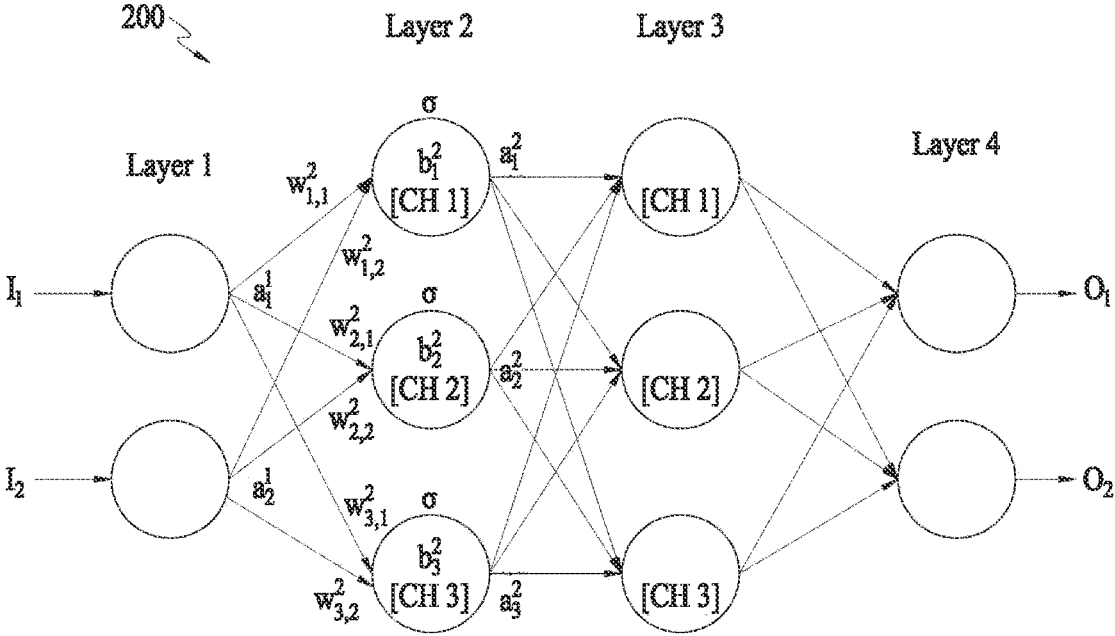
FIG. 2 illustrates an example of an operation performed by a neural network.

FIG. 2 illustrates an example of an operation performed by a neural network.

A neural network 200 has an architecture including an input layer, hidden layers, and an output layer. The neural network 200 may perform an operation based on received input data (e.g., $I_1$ and $I_2$) and generate output data (e.g., $O_1$ and $O_2$) based on a result of performing the operation.

The neural network 200 may be a DNN or n-layer neural network including two or more hidden layers, as described above. For example, as shown in FIG. 2, the neural network 200 may be a DNN including an input layer (Layer 1), two hidden layers (Layer 2 and Layer 3), and an output layer (Layer 4). When the neural network 200 is implemented with a DNN architecture, the neural network 200 includes more layers capable of processing valid information. Thus, the neural network 200 may process more complex data sets than a neural network having a single layer. Meanwhile, although FIG. 2 shows the neural network 200 including four layers as an example, the neural network 200 may include fewer or more layers or fewer or more channels. That is, the neural network 200 may include layers in various architectures different from that shown in FIG. 2.

Each of the layers included in the neural network 200 may include channels, where each of the channels may include or represent artificial nodes known as neurons, processing elements (PEs), units, or other similar terms, configured to process data of the corresponding channel. While the nodes may be referred to as "artificial nodes" or "neurons," such reference is not intended to impart any relatedness with respect to how the neural network architecture computationally maps or thereby intuitively recognizes information and how a human's neurons operate. I.e., the terms "artificial nodes" or "neurons" are merely terms of art referring to the hardware implemented nodes of a neural network. As shown in FIG. 2, Layer 1 may include two channels (or nodes), and each of Layer 2 and Layer 3 may include three channels. However, examples are not limited thereto. Each of the layers included in the neural network 200 may include various numbers of channels (or nodes).

The channels included in each of the layers of the neural network 200 may be connected to each other to process data. For example, one channel may perform an operation by receiving data from other channels, and output an operation result to other channels.

An output value of a channel may be referred to as an activation, or a value which results from such a predetermined activation function of the corresponding channel. An input and an output of each of the channels may be referred to as an input activation and an output activation, respectively. That is, an activation may be a parameter corresponding to an output of one channel and an input for channels included in a subsequent layer, at the same time, due to corresponding connection(s) with the next layer. Meanwhile, each of the channels may determine its activation based on weights and activations received from channels included in a previous layer. A weight is a parameter used to calculate an output activation in each channel, and may be a value assigned to a connection relationship between channels. For example, an output from a previous layer's channel may be provided to as an input to a channel of a next or subsequent layer through a weighted connection between previous layer's channel and the channel of the next layer, with the weight of the weighted connection being variously adjusted during the training of the neural network until the neural network is trained for a desired objective. There may be additional connections to the channel of the next layer, such as for providing a bias connection value through a connection that may or may not be weighted and/or for providing the above example recurrent connection which may be weighted. During training and implementation such connections and connection weights may be selectively implemented, removed, and varied to generate or obtain a resultant neural network that is thereby trained and that may be correspondingly implemented for the trained objective, such as for any of the above example recognition objectives.

Accordingly, each of the channels, or representative nodes of such a channel, may be processed by a computational unit or processing element (e.g., a PE) that receives an input (e.g., through or by further considering such weighted connections) and outputs an output activation, and the input and the output of each of the channels may be mapped. The computational unit may be configured to perform the activation function for a node. As a non-limiting example, when $\sigma$ is an activation function, $w_{jk}^i$ is a weight from a k-th channel included in an (i−1)-th layer to a j-th channel included in an i-th layer, $b_j^i$ is a bias of the j-th channel included in the i-th layer, and $a_j^i$ is an activation of the j-th channel of the i-th layer, the activation $a_j^i$ may be calculated using Equation 1 as follows.

$$a_j^i = \sigma\left(\sum_k \left(w_{jk}^i \times a_k^{i-1}\right) + b_j^i\right)$$

Equation 1

As shown in FIG. 2, an activation of a first channel (CH 1) of the second layer (Layer 2) may be expressed as $a_1^2$. Also, $a_1^2$ may have a value of $a_1^2 = \sigma(w_{1,1}^2 \times a_1^1 + w_{1,2}^2 \times a_2^1 + b_1^2)$ according to Equation 1. The activation function a may be a rectified linear unit (ReLU). However, examples are not limited thereto. For example, the activation function a may be a sigmoid, a hyperbolic tangent (tan h), or a maxout.

As described above, the neural network 200 may exchange numerous data sets between mutually connected channels and perform an operation process through a layer. In this operation process, numerous multiply-accumulate (MAC) operations are performed, and a number of memory access operations need to be performed together to load activations and weights that are operands for the MAC operations at appropriate points in time.

Meanwhile, a general or typical digital computer uses the von Neumann architecture, in which an operation unit and a memory are separated from each other, and a common data bus for data transmission between the two separate blocks is included. Accordingly, in the process of implementing the neural network 200 where data movements and operations are continuously repeated, a lot of time and excessive power consumed for data transmission using the typical digital computer. In order to overcome these technological issues and thereby improve upon the typical digital computer, an in-memory computing circuit of one or more embodiments may have an architecture in which a memory and an operation unit are integrated into one to perform a MAC operation, thereby reducing an amount of time that may be used for data transmission and reducing power consumption. Hereinafter, an example of an in-memory computing circuit will be described in detail with reference to FIG. 3.

Figure 3:
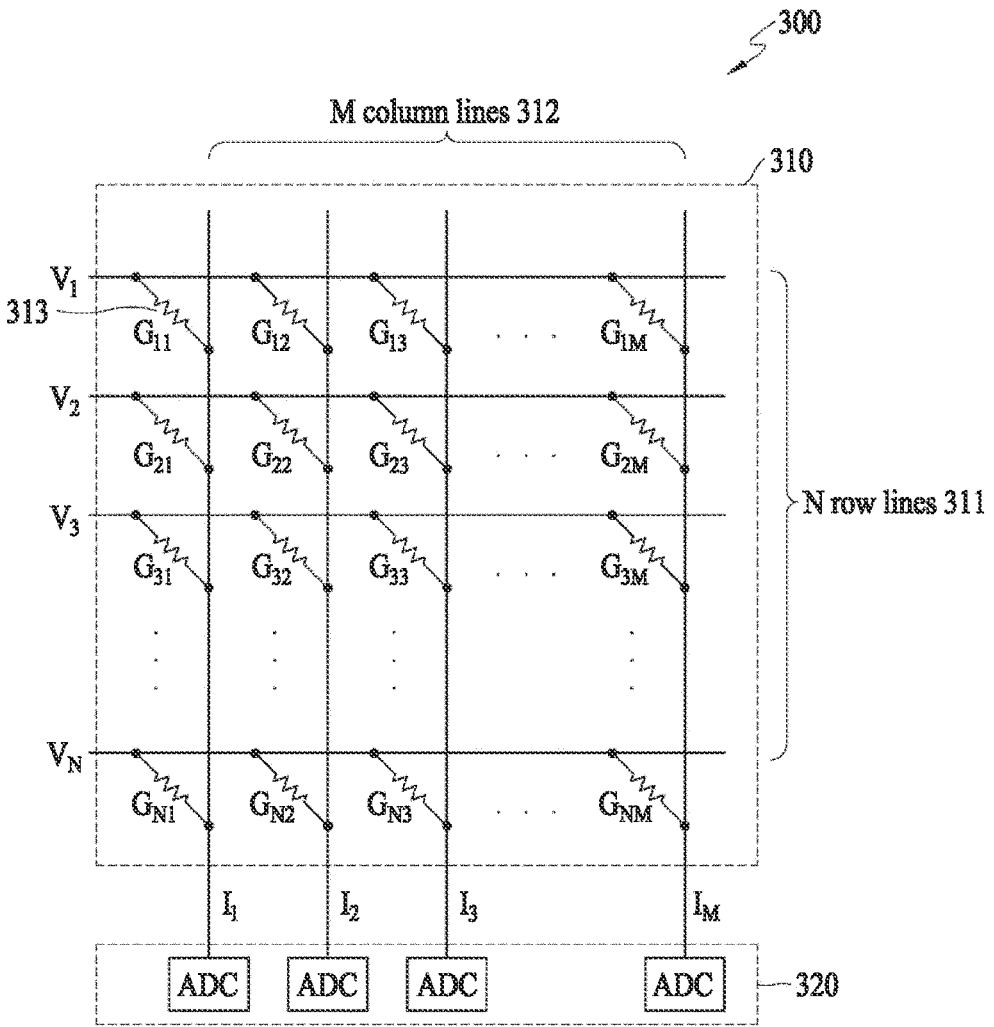
FIG. 3 illustrates an example of an in-memory computing circuit.

FIG. 3 illustrates an example of an in-memory computing circuit.

An in-memory computing circuit 300 may include an analog crossbar array 310 and one or more analog-to-digital converters (ADCs) 320. Although FIG. 3 shows the components related to this example in the in-memory computing circuit 300, it may be apparent after an understanding of the present disclosure that the in-memory computing circuit 300 may further include other components in addition to the components shown in FIG. 3.

The analog crossbar array 310 may include row lines 311, column lines 312, and memory cells 313. The row lines 311 may be used to receive input data, and may also be referred to as input lines. For example, when the row lines 311 are N row lines (N being a predetermined natural number), voltages $V_1, V_2, \ldots, V_N$ corresponding to input activations may be applied to the N row lines. The column lines 312 may intersect the row lines 311. For example, when the column lines 312 are M column lines (M being a predetermined natural number), the column lines 312 and the row lines 311 may intersect at N×M intersecting points.

Meanwhile, the memory cells 313 may be disposed at the intersecting points between the row lines 311 and the column lines 312. Each of the memory cells 313 may be implemented as a non-volatile memory such as resistive RAM (ReRAM), magnetic RAM (MRAM), or eFlash, to store weights. However, examples are not limited thereto, and each of the memory cells 313 may be a volatile memory such as static random-access memory (SRAM) according to other non-limiting examples.

In the example shown in FIG. 3, the memory cells 313 have conductance $G_{11}, \ldots, G_{NM}$ corresponding to the weights. Thus, when a voltage corresponding to an input activation is applied to each of the low lines 311, a current having a magnitude of I=V×G may be output through each of the memory cells 313 according to Ohm's law. Since currents output from memory cells disposed along one column line are combined, current sums $I_1, \ldots, I_M$ may be output along the column lines 312. The current sums $I_1, \ldots, I_M$ may correspond to the results of MAC operation performed in an analog manner. Accordingly, the column lines 312 may also be referred to as output lines.

The one or more ADCs 320 may convert the results of the analog MAC operation (e.g., the current sums $I_1, \ldots, I_M$) output from the analog crossbar array 310 into digital signals. The results of MAC operation converted into digital signals may be output from the ADCs 320 and used for a subsequent neural network operation process.

As such, the in-memory computing circuit 300 of one or more embodiments as shown in FIG. 3 may perform a MAC operation with low power and thus, may be a hardware architecture that is effective to low-power driving of a neural network model. Since the analog crossbar array 310 may perform storing the weight value and the MAC operation at the same time, the in-memory computing circuit 300 of one or more embodiments may reduce energy consumption for the movement of model parameters and thus, thereby greatly reduce the energy consumed for driving a neural network and performing an operation, when compared to the typical von Neumann digital architecture. In the operation of the analog crossbar array 310, input values may be input to respective row lines 311, transmitted identically to each of the memory cells disposed on the same row lines, and multiplied by a weight value stored in the corresponding memory cell, and multiplication operation results of the respective memory cells may be summed and output for respective column lines 312.

The analog crossbar array 310 shown in FIG. 3 may be based on a real-valued neural network that performs training and inference based on a real-valued MAC operation generally utilized in the field of artificial intelligence. Herein, for ease of description, real-valued neural networks may be referred to as RVNNs.

On the contrary, there may be a neural network that performs training and inference based on a multidimensional vector MAC operation. A neural network that performs a complex value-based MAC operation may be referred to as a complex-valued neural network (CVNN), and a neural network that performs a quaternion-based MAC operation may be referred to as a quaternion neural network (QNN). A CVNN and a QNN may exhibit higher training performance than an RVNN in application fields such as speech recognition, image recognition, and space recognition, as non-limiting examples.

Hereinafter, examples of efficient structures and operation methods of computing devices that perform complex value-based or quaternion-based MAC operations will be described in detail with reference to the drawings.

Figure 4:
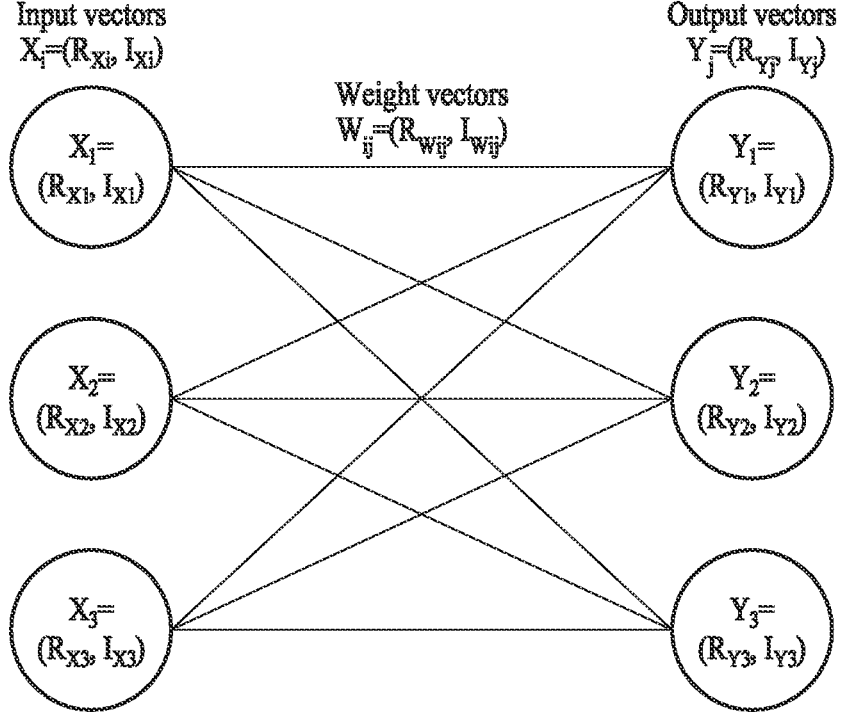
FIG. 4 illustrates an example of an operation performed by a complex-valued neural network.

FIG. 4 illustrates an example of an operation performed by a complex-valued neural network.

Referring to FIG. 4, a complex value-based neural network is shown. Input vectors may be two-dimensional vectors, and each input vector $X_i$ may include a real element $R_{Xi}$ and an imaginary element $I_{Xi}$ (here, i is a natural number). Further, output vectors may be two-dimensional vectors, and each output vector $Y_j$ may include a real element $R_{Yj}$ and an imaginary element $I_{Yj}$ (here, j is a natural number). In addition, weight vectors may also be two-dimensional vectors, and each weight vector $W_{ij}$ may denote a connection weight between an i-th input node and a j-th output node and may include a real element $R_{Wij}$ and an imaginary element $I_{Wij}$.

A complex value may be a two-dimensional vector expressed by one real element and one imaginary element i. For example, the multiplication and addition between complex values $C_1 = a_1 + b_1 i$ and $C_2 = a_2 + b_2 i$ may be performed as follows, for example.

$$C_1 + C_2 = (a_1 + a_2) + (b_1 + b_2)i$$

$$C_1 \times C_2 = (a_1 \times a_2 - b_1 \times b_2) + (a_1 \times b_2 + a_2 \times b_1)i$$

A complex value-based MAC operation may be performed based on the multiplication and addition between a complex input $P^c_j = a^p_j + b^p_j i$ and a complex weight $w^c_{lm} = a^w_{lm} + b^w_{lm} i$, and may be expressed by Equation 2 below, for example.

$$S^c_m = \sum_{l=1}^{L} P^c_l \times W^c_{lm} = \sum_{l=1}^{L} (a^p_l + b^p_l i) \times (a^w_{lm} + b^w_{lm} i) \qquad \text{Equation 2}$$

For example, in speech recognition, a complex signal may be obtained for each frequency band through a Fourier transform prior to inputting a sound wave signal in an audio file such as a way file to a neural network model. In the complex signal, a real element may represent an intensity of the sound wave signal, and an imaginary element may represent a phase of the sound wave signal.

In an RVNN, each input node may receive and output only one-dimensional real values. Thus, training and inference of the RVNN may be performed by separating real elements and imaginary elements of N complex signals obtained through the Fourier transform and inputting each of the values to 2N input nodes or by inputting only the values of the real elements of the complex signals to N input nodes of the RVNN. When the typical RVNN is driven (e.g., when training and/or inference are performed by the RVNN) while a correlation between a real element and an imaginary element of each complex signal (e.g., a correlation between the intensity and the phase of the sound wave signal) is dissipated, the training and inference performance may be lowered, or a model for increasing the training and inference performance by reconstructing the RVNN with the original correlation between a real element and an imaginary element of a complex sound wave signal may require considerable size and computational complexity.

On the contrary, since each input node in a CVNN of one or more embodiments may receive and output complex values, the CVNN may perform training and inference by inputting the complex signals obtained through the Fourier transform as they are, unlike the typical RVNN. In other words, since the CVNN of one or more embodiments may perform training and inference while maintaining the correlation between the real element and the imaginary element of the complex signal as it is, the CVNN may realize higher training and inference performance compared to the typical RVNN.

Since various signals that exist in nature, such as sound wave signals, may be mostly defined by multidimensional vectors, multidimensional vector MAC operation-based neural networks (e.g., CVNN, QNN) may achieve relatively high training and inference performance compared to the typical RVNN. However, as described in Equation 2, a complex value-based MAC operation may perform four times more operations in a single MAC operation than the RVNN. To solve this technological issue of the complex value-based MAC operation, the structure and operation method of a computing device of one or more embodiments may efficiently perform a complex value-based MAC operation, examples of which will be described in detail below.

Figure 5:
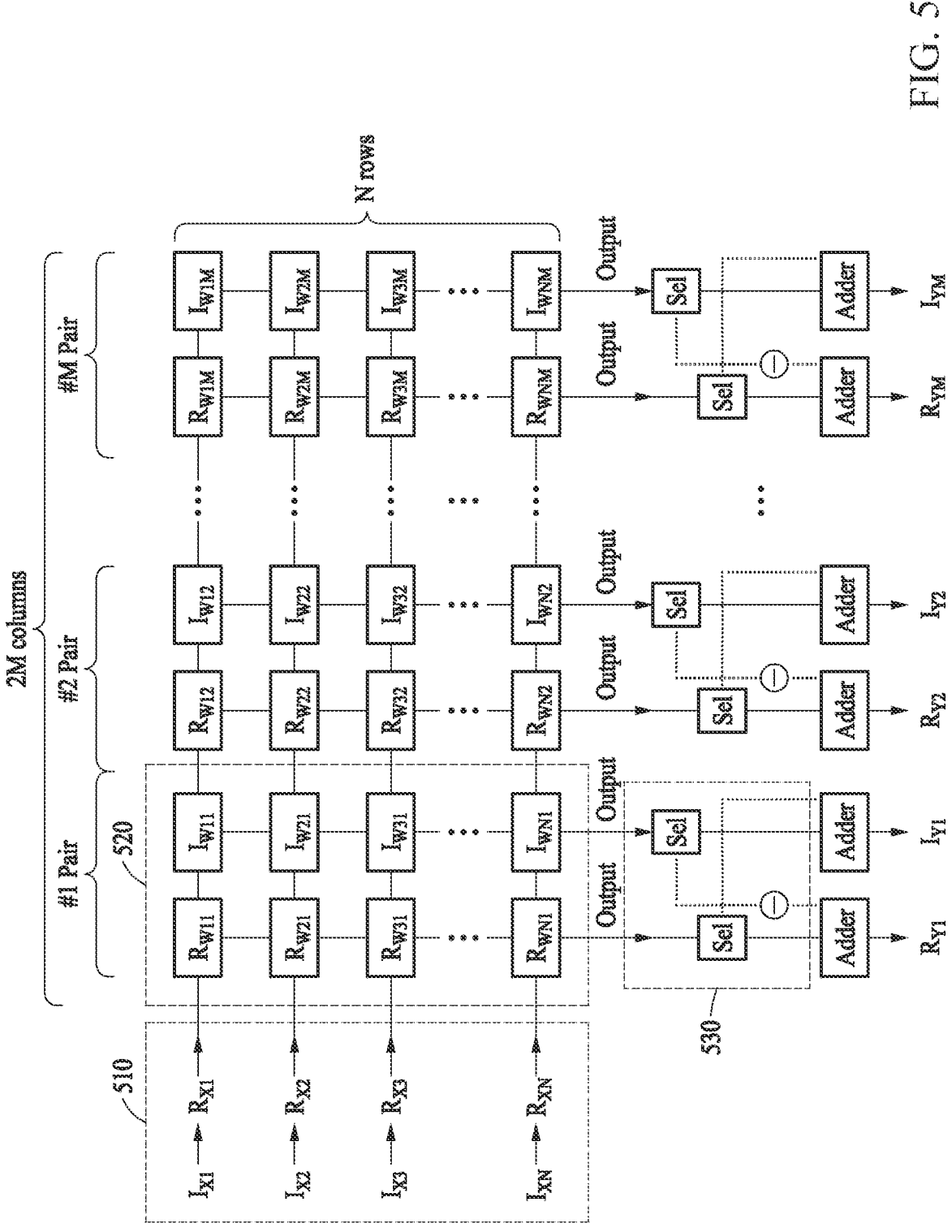
FIGS. 5 to 7 illustrate examples of a structure and operation of a computing device for a complex-valued neural network.
Figure 6:
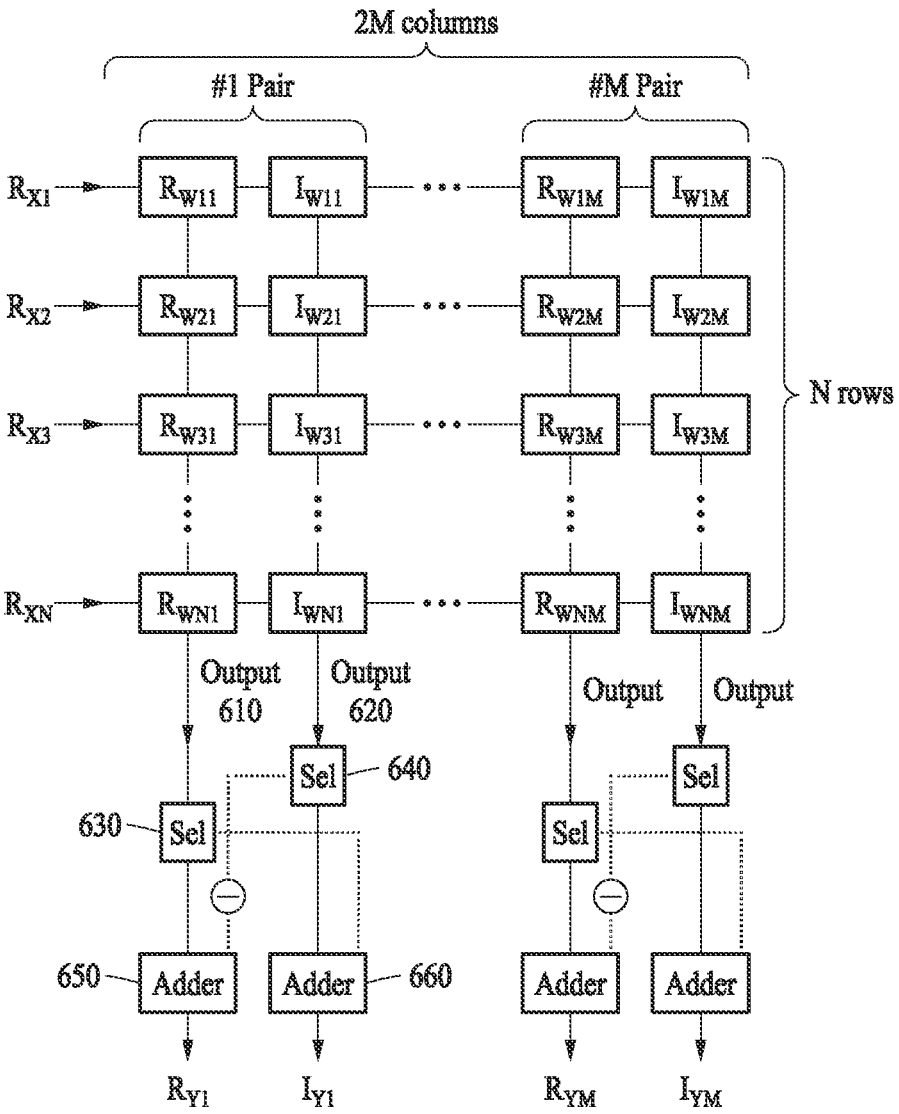
Figure 7:
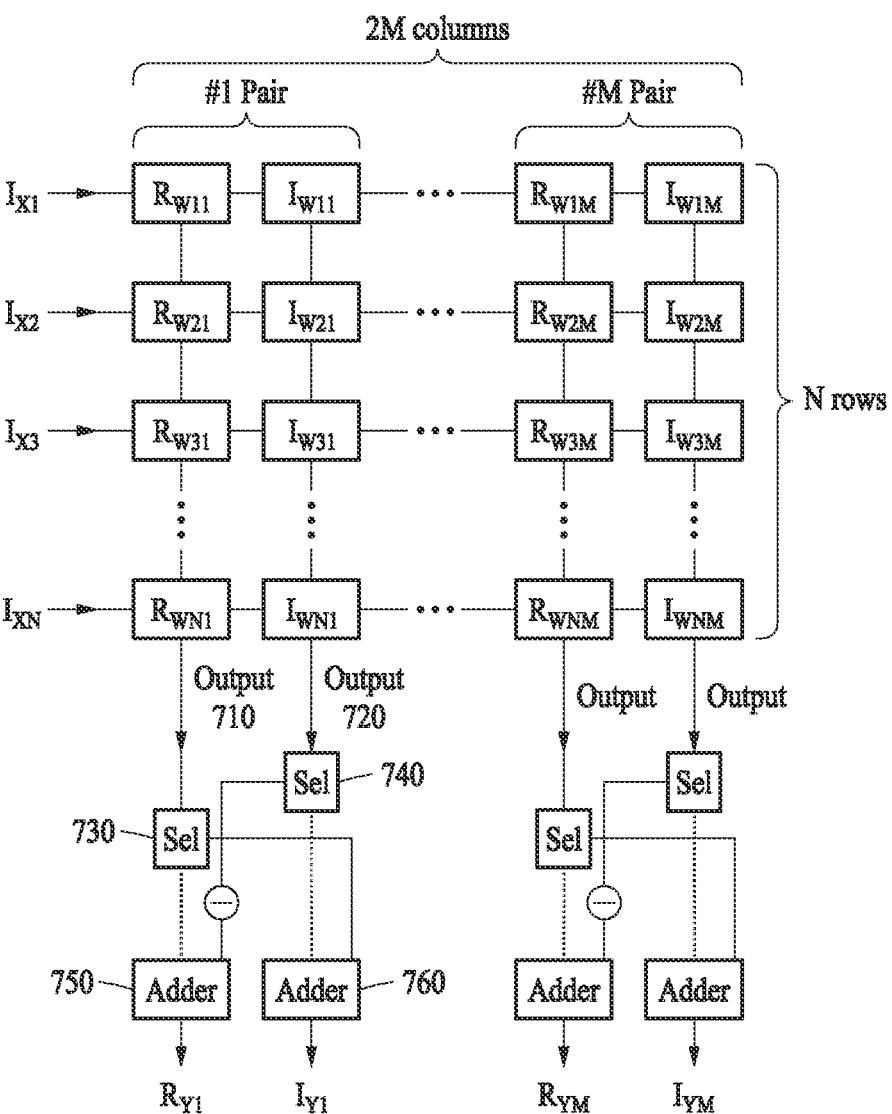

FIGS. 5 to 7 illustrate examples of a structure and operation of a computing device for a complex-valued neural network.

Referring to FIG. 5, a computing device for performing a complex value-based MAC operation may include a crossbar array, selectors (shown as "Sel" in FIG. 5), and adders. The crossbar array may include N input lines to which two-dimensional input vectors 510 are input, 2M output lines intersecting the input lines, and N×2M memory cells disposed at intersecting points between the input lines and the output lines.

In the complex value-based MAC operation, a commutative law between real and imaginary elements of a two-dimensional input vector and real and imaginary elements of a two-dimensional weight vector may be established as shown in Equation 2. In order to implement such a complex value-based MAC operation in the computing device including the crossbar array, first, weight elements included in each of two-dimensional weight vectors may be stored in reference memory cells that connect a corresponding single reference input line and corresponding two reference output lines. For example, a real element $R_{W11}$ in a weight vector $W_{11}$ may be stored in a memory cell disposed at an intersecting point between an input line of a first row and an output line of a first column. An imaginary element $I_{W11}$ in the weight vector $W_{11}$ may be stored in a memory cell disposed at an intersecting point between the input line of the first row and an output line of a second column. In summary, weight elements (e.g., a real element and an imaginary element) included in each of the two-dimensional weight vectors may be stored in reference memory cells connected to different reference output lines.

Meanwhile, each of the input lines may correspond to one input node, while two of the output lines may correspond to one output node. When there are M output nodes, the crossbar array may include 2M output lines. Memory cells connected to one of two output lines 520 corresponding to one output node may store real elements of weight vectors connected to the corresponding output node, and memory cells connected to the other of the two output lines 520 may store imaginary elements of the weight vectors connected to the corresponding output node. A pair of two output lines may correspond to one output node.

N two-dimensional input vectors 510 may be input to N input lines. Input elements included in each of the input vectors 510 may be sequentially input to the same reference input line. For example, a real element $R_{X1}$ of a first input vector $X_1$ may be input to the input line of the first row in a first cycle. An imaginary element $I_{X1}$ of the first input vector $X_1$ may be input to the input line of the first row in a second cycle. Accordingly, I input vectors 510 may be input to a corresponding input line in two cycles. The number (e.g., the total or predetermined number) of cycles in which the input vectors 510 are input may be equal to the number of dimensions of the input vectors 510.

For two cycles, input elements of the input vectors 510 sequentially input to the input lines may be multiplied by weight elements stored in the memory cells, and a sum of products may be determined and output according to the output lines. The operation result output from each output line may be transmitted to any one of the adders through the selectors 530. For example, an operation result of any one of the reference output lines corresponding to the first output node may be transmitted to any one of two adders through a corresponding first selector, and an operation result of the other of the reference output lines may be transmitted to the other of the two adders through a corresponding second selector.

The adders may determine output elements included in an output vector by accumulating the operation results received from the selectors for two cycles. For example, the operation results accumulated by the first adder for two cycles may be determined as a real element $R_{Y1}$ of the first output vector, and the operation results accumulated by the second adder for two cycles may be determined as an imaginary element $I_{Y1}$ of the first output vector.

An example the operation of the computing device for performing a complex value-based MAC operation will be described in detail with reference to FIGS. 6 and 7.

Referring to FIG. 6, the operation of the computing device in a first cycle of the complex value-based MAC operation is illustrated. In the first cycle, a real element of each of two-dimensional input vectors may be input to a corresponding input line. The real elements of respective two-dimensional input vectors input to the input lines may be multiplied by weight elements stored in memory cells. For example, the real element $R_{X1}$ of the first input vector input to the input line of the first row may be multiplied by each of weight elements $R_{W11}, I_{W11}, \ldots, R_{W1M}$, and $I_{W1M}$ stored in memory cells connected to the input line of the first row.

Each of the selectors may transmit an operation result output from each output line to any one of the adders. For example, an operation result 610 output from the output line of the first column may be $R_{X1} \times R_{W11} + R_{X2} \times R_{W21} + R_{X3} \times R_{W31} + \ldots + R_{XN} \times R_{WN1}$, which is a MAC operation result for a real element of each input vector and a real element of each weight vector associated with the first output node. A first selector 630 may transmit the operation result 610 to a first adder 650. Further, an operation result 620 output from the output line of the second column may be $R_{X1} \times I_{W11} + R_{X2} \times I_{W21} + R_{X3} \times I_{W31} + \ldots + R_{XN} \times I_{WN1}$, which is a MAC operation result for the real element of each input vector and an imaginary element of each weight vector associated with the first output node. A second selector 640 may transmit the operation result 620 to a second adder 660.

The above description of the results of operations performed by the output lines of the first and second columns and the operation of transmitting the same may apply to the output lines of the other columns likewise. Thus, a further detailed description will be omitted.

Referring to FIG. 7, the operation of the computing device in a second cycle of the complex value-based MAC operation is illustrated. In the second cycle, an imaginary element of each of the two-dimensional input vectors may be input to a corresponding input line. The imaginary elements of respective two-dimensional input vectors input to the input lines may be multiplied by the weight elements stored in the memory cells. For example, the imaginary element $I_{X1}$ of the first input vector input to the input line of the first row may be multiplied by each of the weight elements $R_{W11}, I_{W11}, \ldots, R_{W1M}$, and $I_{W1M}$ stored in the memory cells connected to the input line of the first row.

Each of the selectors may transmit an operation result output from each output line to any one of the adders. For example, an operation result 710 output from the output line of the first column may be $I_{X1} \times R_{W11} + I_{X2} \times R_{W21} + I_{X3} \times R_{W31} + \ldots + I_{XN} \times R_{WN1}$, which is a MAC operation result for an imaginary element of each input vector and a real element of each weight vector associated with the first output node. A first selector 730 (e.g., the first selector 630 of FIG. 6) may transmit the operation result 710 to a second adder 760 (e.g., the second adder 660 of FIG. 6). Further, an operation result

720 output from the output line of the second column may be $I_{X1} \times I_{W11} + I_{X2} \times I_{W21} + I_{X3} \times I_{W31} + \ldots + I_{XN} \times I_{WN1}$, which is a MAC operation result for the imaginary element of each input vector and the imaginary element of each weight vector associated with the first output node. Since the operation result 720 is the sum of products between imaginary elements, a second selector 740 (e.g., the second selector 640 of FIG. 6) may invert a sign of the operation result 720 and transmit the operation result with the inverted sign to a first adder 750 (e.g., the first adder 650 of FIG. 6).

The first adder 750 may accumulate the operation results received for two cycles, and the real element of the first output vector may be determined as a result of the accumulating by the first adder 750. The second adder 760 may accumulate the operation results received for two cycles, and the imaginary element of the first output vector may be determined as a result of the accumulating by the second adder 760.

The complex value-based MAC operation performed by the computing device may be expressed by Equation 3 below, for example.

$$Y_m = \sum (X_n \otimes W_{nm})$$

$$= \sum ((R_{XN} + I_{XN} \cdot i) \otimes (R_{WNM} + I_{WNM} \cdot i))$$

$$= \sum \{(R_{XN} \cdot R_{WNM} - I_{XN} \cdot I_{WNM}) +$$
$$(R_{XN} \cdot I_{WNM} + I_{XN} \cdot R_{WNM}) \cdot i\}$$

Equation 3

In Equation 3 above, $R_{XN} \cdot R_{WNM}$ corresponds to the operation result 610 of FIG. 6, $-I_{XN} \cdot I_{WNM}$ corresponds to the operation result 720 of FIG. 7, $R_{XN} \cdot I_{WNM}$ corresponds to the operation result 620 of FIG. 6, and $I_{XN} \cdot R_{WNM}$ corresponds to the operation result 710 of FIG. 7.

For ease of description, the computing operation associated with the first output node has been described. However, the above description may apply to the computing operations of the other output nodes likewise. As such, the computing device of one or more embodiments may effectively obtain complex value-based MAC operation results with the two-cycle operation of the computing device, thereby improving upon typical computing devices which may obtain complex value-based MAC operation results with a greater amount of cycles and/or operations.

Figure 8:
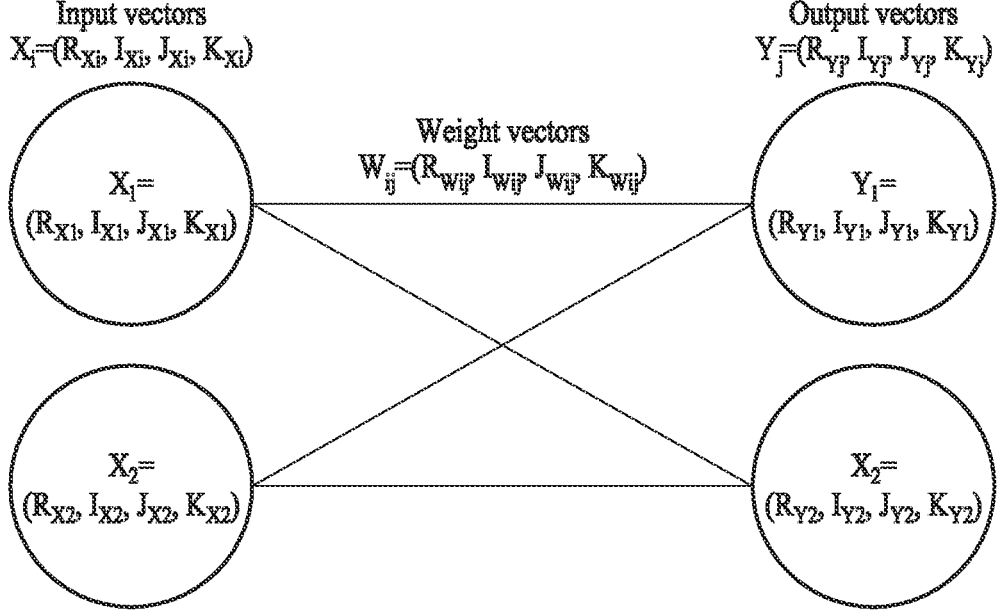
FIG. 8 illustrates an example of an operation performed by a quaternion neural network.

FIG. 8 illustrates an example of an operation performed by a quaternion neural network.

Referring to FIG. 8, a quaternion-based neural network is shown. Input vectors may be four-dimensional vectors, and each input vector $X_i$ may include a real element $R_{Xi}$ and imaginary elements $I_{Xi}$, $J_{Xi}$, and $K_{Xi}$ (herl, i is a natural number). Further, output vectors may be four-dimensional vectors, and each output vector $Y_j$ may include a real element $R_{Yj}$ and imaginary elements $I_{Yj}$, $J_{Yj}$, and $K_{Yj}$ (here, j is a natural number). In addition, weight vectors may also be four-dimensional vectors, and each weight vector $W_{ij}$ may denote a connection weight between an i-th input node and a j-th output node and may include a real element $R_{Wij}$ and imaginary elements $I_{Wij}$, $J_{Wij}$, and $K_{Wij}$.

A quaternion may be a four-dimensional vector expressed by one real element and three imaginary elements i, j, and k, wherein the three imaginary elements i, j, and k are each in an orthogonal state. Therefore, the multiplication and addition between quaternions $Q_1 = a_1 + b_1 i + c_1 j + d_1 k$ and $Q_2 = a_2 + b_2 i + c_2 j + d_2 k$ may be performed as follows, for example.

$$Q_1 + Q_2 = (a_1 + a_2) + (b_1 + b_2)i + (c_1 + c_2)j + (d_1 + d_2)k$$

$$Q_1 \times Q_2 = (a_1 \times a_2 - b_1 \times b_2 - c_1 \times c_2 - d_1 \times d_2) + (a_1 \times b_2 + b_1 \times a_2 + c_1 \times d_2 - d_1 \times c_2)i + (a_1 \times c_2 - b_1 \times d_2 + c_1 \times a_2 + d_1 \times b_2)j + (a_1 \times d_2 + b_1 \times c_2 - c_1 \times b_2 + d_1 \times a_2)k$$

A quaternion-based MAC operation may be performed based on the multiplication and addition among a quaternion input $P^q_l = a^p_l + b^p_l i + c^p_l j + d^p_l k$, a quaternion weight $W^q_{lm} = a^w_{lm} + b^w_{lm} i + c^w_{lm} j + d^w_{lm} k$, and a conjugate of the quaternion weight $W^q_{lm}^* = -a^w_{lm} - ^w_{lm} i - ^w_{lm} j - d^w_{lm} k$, and may be expressed by Equation 4 below, for example.

$$S^q_m = \sum_{l=1}^{L} \frac{W^q_{lm} \times P^q_l \times W^q_{lm}}{W^q_{lm} \times W^q_{lm}} =$$

$$(a^w_{lm} + b^w_{lm} i + c^w_{lm} j + d^w_{lm} k) \times$$
$$\sum_{l=1}^{L} \frac{(a^p_l + b^p_l i + c^p_l j + d^p_l k) \times (a^w_{lm} - b^w_{lm} i - c^w_{lm} j - d^w_{lm} k)}{(a^w_{lm} + b^w_{lm} i + c^w_{lm} j + d^w_{lm} k) \times (a^w_{lm} - b^w_{lm} i - c^w_{lm} j - d^w_{lm} k)}$$

Equation 4

In space recognition, for example, three-dimensional spatial coordinate data of x, y, and z for a position change and movement of an object may be handled. In order to input N pieces of three-dimensional spatial coordinate data, an RVNN may separate each of the x, y, and z values of the data and transmit the x, y, and z values to a total of 3N input nodes. When training and inference are performed by the typical RVNN while the original correlation among the x, y, and z values in each three-dimensional spatial coordinate data is dissipated, low training and inference performance may be exhibited, or a model for increasing the training and inference performance by reconstructing the RVNN with the correlation among the x, y, and z values may require considerable size and computational complexity.

On the contrary, a QNN of one or more embodiments may receive and output quaternion values and thus, perform training and inference while maintaining the correlation among the x, y, and z values by expressing the x, y, and z values of the three-dimensional spatial coordinate data with three imaginary elements i, j, and k of a quaternion. In other words, since the QNN of one or more embodiments may perform training and inference while maintaining the correlation among the x, y, and z values of the three-dimensional spatial coordinate data as it is, the QNN may realize higher training and inference performance compared to the typical RVNN.

In image recognition, the QNN may perform training and inference while maintaining a correlation among R, G, and B values of each pixel by expressing the R, G, and B values with three imaginary elements i, j, and k of a quaternion (here, the correlation among the R, G, and B values may indicate specific color information of each pixel), thereby realizing higher training and inference performance compared to the typical RVNN.

Since various signals that exist in nature, such as three-dimensional spatial coordinate data or pixel values, may be mostly defined by multidimensional vectors, multidimensional vector MAC operation-based neural networks (e.g., CVNN, QNN) may achieve relatively high training and inference performance compared to the typical RVNN. However, as described in Equation 3, a quaternion-based MAC operation may perform thirty-two times more operations in a single MAC operation than the RVNN. To solve this technological issue of the quaternion-based MAC operation, the structure and operation method of a computing device of one or more embodiments may efficiently perform a quaternion-based MAC operation, examples of which will be described in detail below.

FIGS. 9 to 16 illustrate examples of a structure and operation of a computing device for a quaternion neural network.

A computing device for performing a quaternion-based MAC operation may include a crossbar array, sign selectors, adder selectors, and adders. The crossbar array may include N input lines to which four-dimensional input vectors are input, 4M output lines intersecting the input lines, and N×4M memory cells disposed at intersecting points between the input lines and the output lines. Since a quaternion may include one real element and three imaginary elements, 4M output lines may be used to determine M output vectors.

In the quaternion-based MAC operation, a commutative law between a real element and three imaginary elements of a four-dimensional input vector and a real element and three imaginary elements of a weight vector may be established as shown in Equation 3. In order to implement such a quaternion-based MAC operation in the computing device including the crossbar array, first, weight elements included in each of four-dimensional weight vectors may be stored in reference memory cells that connect a corresponding single reference input line and corresponding four reference output lines. For example, a real element $R_{W11}$ in a weight vector $W_{11}$ may be stored in a memory cell disposed at an intersecting point between an input line of a first row and an output line of a first column. An imaginary element in the weight vector $W_{11}$ may be stored in a memory cell disposed at an intersecting point between the input line of the first row and an output line of a second column. An imaginary element $J_{W11}$ in the weight vector $W_{11}$ may be stored in a memory cell disposed at an intersecting point between the input line of the first row and an output line of a third column. An imaginary element $K_{W11}$ in the weight vector $W_{11}$ may be stored in a memory cell disposed at an intersecting point between the input line of the first row and an output line of a fourth column. In summary, weight elements (e.g., a real element and three imaginary elements) included in each of the four-dimensional weight vectors may be stored in reference memory cells connected to different reference output lines. In some examples, in order to maximize the efficiency of the crossbar array operation, values obtained by dividing the real element and the imaginary elements of each weight vector respectively by the size of a weight vector (for example, a result of multiplying the weight vector and a conjugate weight vector) may be stored in the memory cells.

Meanwhile, each of the input lines may correspond to one input node, while four of the output lines may correspond to one output node. When there are M output nodes, the crossbar array may include 4M output lines. Memory cells connected to a first output line of four output lines corresponding to one output node may store real elements of weight vectors connected to the corresponding output node. Memory cells connected to a second output line may store imaginary elements i of the weight vectors connected to the corresponding output node. Memory cells connected to a third output line may store imaginary elements j of the weight vectors connected to the corresponding output node. Memory cells connected to a fourth output line may store imaginary elements k of the weight vectors connected to the corresponding output node. A pair of four output lines may correspond to one output node.

While examples of the computing device for performing a complex value-based MAC operation may include selectors and adders as described above, the computing device for performing a quaternion-based MAC operation may further include sign selectors and adder selectors. A sign of an operation result output from each output line may be determined by a corresponding sign selector, and the operation result with the determined sign may be transmitted to any one of the adders by a corresponding adder selector. According to non-limiting examples, the computing device for performing a quaternion-based MAC operation may include the components of the computing device for performing a complex value-based MAC operation, and thus may be configured to perform both the complex value-based MAC operation and the quaternion-based MAC operation.

An example of the operation of the computing device for performing a quaternion-based MAC operation for eight cycles will be described in detail with reference to FIGS. 9 to 16.

Figure 9:
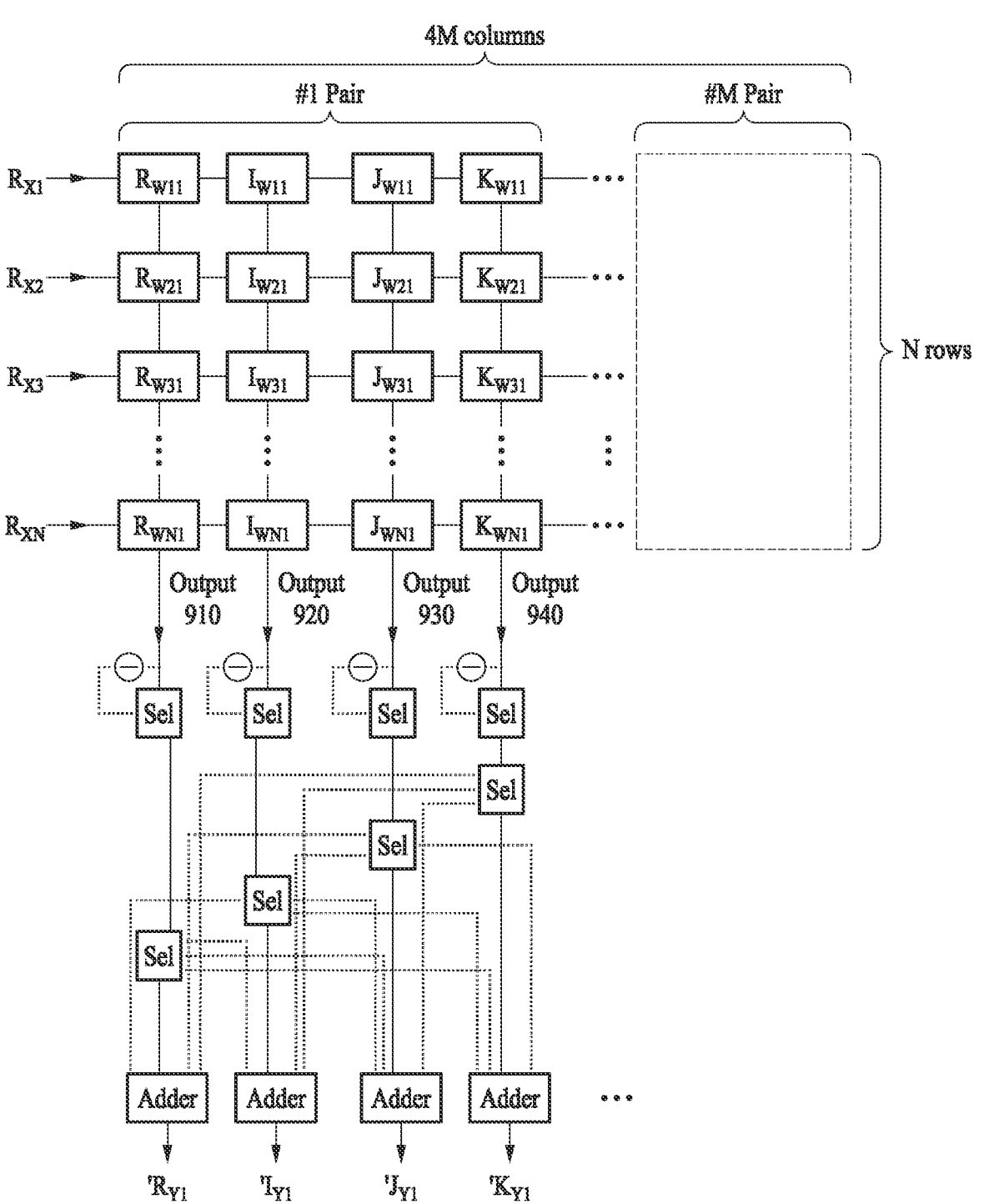
FIGS. 9 to 16 illustrate examples of a structure and operation of a computing device for a quaternion neural network.

Referring to FIG. 9, the operation of the computing device in a first cycle of the quaternion-based MAC operation is illustrated. In the first cycle, a real element of each of four-dimensional input vectors may be input to a corresponding input line. The real elements of respective four-dimensional input vectors input to the input lines may be multiplied by weight elements stored in memory cells. For example, the real element $R_{X1}$ of the first input vector input to the input line of the first row may be multiplied by each of weight elements $R_{W11}$, $I_{W11}$, $J_{W11}$, $K_{W11}$, $\ldots$, $R_{W1M}$, $I_{W1M}$, $J_{W1M}$, and $K_{W1M}$ stored in memory cells connected to the input line of the first row.

Each of the sign selectors may determine a sign of an operation result output from each output line, and each of the adder selectors may transmit the operation result output from each output line to any one of the adders. For example, an operation result 910 output from the output line of the first column may be $R_{X1} \times R_{W11} + R_{X2} \times R_{W21} + R_{X3} \times R_{W31} + \cdots + R_{XN} \times R_{WN1}$, which is a MAC operation result for a real element of each input vector and a real element of each weight vector associated with the first output node. A first sign selector may determine a sign of the operation result 910 as +, and a first adder selector may transmit the operation result 910 to a first adder. Further, an operation result 920 output from the output line of the second column may be $R_{X1} \times I_{W11} + R_{X2} \times I_{W21} + R_{X3} \times I_{W31} + \cdots + R_{XN} \times I_{WN1}$, which is a MAC operation result for the real element of each input vector and an imaginary element i of each weight vector associated with the first output node. A second sign selector may determine a sign of the operation result 920 as +, and a second adder selector may transmit the operation result 920 to a second adder. Further, an operation result 930 output from the output line of the third column may be $R_{X1} \times J_{W11} R_{X2} \times J_{W21} + R_{X3} \times J_{W31} + \cdots + R_{XN} \times J_{WN1}$, which is a MAC operation result for the real element of each input vector and an imaginary element j of each weight vector associated with the first output node. A third sign selector may determine a sign of the operation result 930 as +, and a third adder selector may transmit the operation result 930 to a third adder. Further, an operation result 940 output from the output line of the fourth column may be $R_{X1} \times K_{W11} + R_{X2} \times K_{W21} + R_{X3} \times K_{W31} + \cdots + R_{XN} \times K_{WN1}$, which is a MAC operation result for the real element of each input vector and an imaginary element k of each weight vector associated with the first output node. A fourth sign selector may determine a sign of the operation result 940 as +, and a fourth adder selector may transmit the operation result 940 to a fourth adder.

The above description of the results of operations performed by the output lines of the first to fourth columns and the operation of transmitting the same may apply to the output lines of the other columns likewise. Thus, a further detailed description will be omitted.

Figure 10:
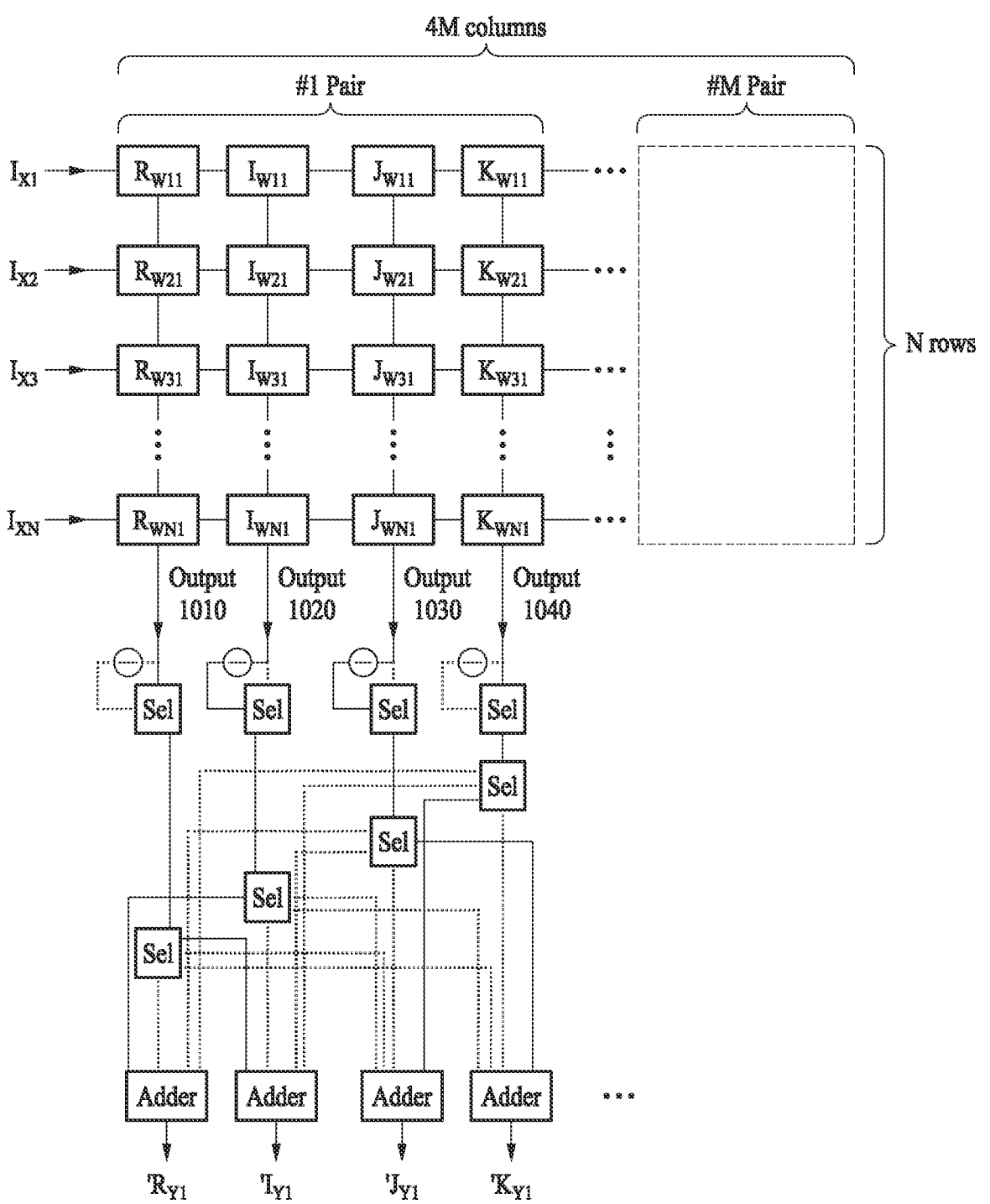

Referring to FIG. 10, the operation of the computing device in a second cycle of the quaternion-based MAC operation is illustrated. In the second cycle, an imaginary element i of each of the four-dimensional input vectors may be input to a corresponding input line. The imaginary elements i of respective four-dimensional input vectors input to the input lines may be multiplied by the weight elements stored in the memory cells. For example, the imaginary element $I_{X1}$ of the first input vector input to the input line of the first row may be multiplied by each of the weight elements $R_{W11}$, $I_{W11}$, $J_{W11}$, $K_{W11}$, ..., $R_{W1M}$, $I_{W1M}$, $J_{W1M}$, and $K_{W1M}$ stored in the memory cells connected to the input line of the first row.

Each of the sign selectors may determine a sign of an operation result output from each output line, and each of the adder selectors may transmit the operation result output from each output line to any one of the adders. For example, an operation result 1010 output from the output line of the first column may be $I_{X1} \times R_{W11} + I_{X2} \times R_{W21} + I_{X3} \times R_{W31} + \ldots + I_{XN} \times R_{WN1}$, which is a MAC operation result for an imaginary element i of each input vector and a real element of each weight vector associated with the first output node. The first sign selector may determine a sign of the operation result 1010 as +, and the first adder selector may transmit the operation result 1010 to the second adder. Further, an operation result 1020 output from the output line of the second column may be $I_{X1} \times I_{W11} + I_{X2} \times I_{W21} + I_{X3} \times I_{W31} + \ldots + I_{XN} \times I_{WN1}$, which is a MAC operation result for the imaginary element i of each input vector and the imaginary element i of each weight vector associated with the first output node. The second sign selector may determine a sign of the operation result 1020 as −, and the second adder selector may transmit the operation result 1020 to the first adder. Further, an operation result 1030 output from the output line of the third column may be $I_{X1} \times J_{W11} + I_{X2} \times J_{W21} + I_{X3} \times J_{W31} + \ldots + I_{XN} \times J_{WN1}$, which is a MAC operation result for the imaginary element i of each input vector and the imaginary element j of each weight vector associated with the first output node. The third sign selector may determine a sign of the operation result 1030 as −, and the third adder selector may transmit the operation result 1030 to the fourth adder. Further, an operation result 1040 output from the output line of the fourth column may be $I_{X1} \times K_{W11} + I_{X2} \times K_{W21} + I_{X3} \times K_{W31} + \ldots + I_{XN} \times K_{WN1}$, which is a MAC operation result for the imaginary element i of each input vector and the imaginary element k of each weight vector associated with the first output node. The fourth sign selector may determine a sign of the operation result 1040 as +, and the fourth adder selector may transmit the operation result 1040 to the third adder.

The above description of the results of operations performed by the output lines of the first to fourth columns and the operation of transmitting the same may apply to the output lines of the other columns likewise. Thus, a further detailed description will be omitted.

Figure 11:
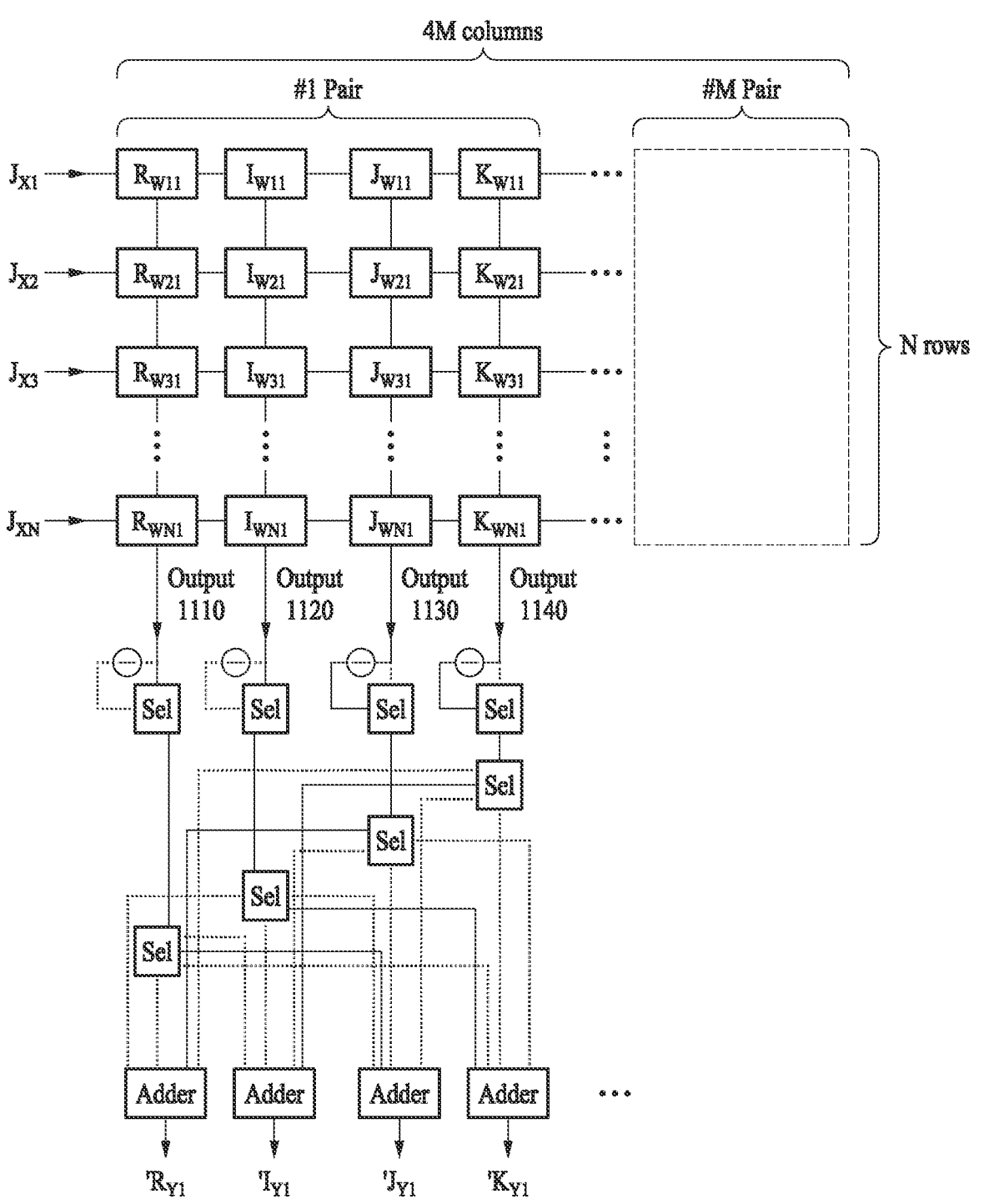

Referring to FIG. 11, the operation of the computing device in a third cycle of the quaternion-based MAC operation is illustrated. In the third cycle, an imaginary element j of each of the four-dimensional input vectors may be input to a corresponding input line. The imaginary elements j of respective four-dimensional input vectors input to the input lines may be multiplied by the weight elements stored in the memory cells. For example, the imaginary element $J_{X1}$ of the first input vector input to the input line of the first row may be multiplied by each of the weight elements $R_{W11}$, $I_{W11}$, $J_{W11}$, $K_{W11}$, ..., $R_{W1M}$, $I_{W1M}$, $J_{W1M}$, and $K_{W1M}$ stored in the memory cells connected to the input line of the first row.

Each of the sign selectors may determine a sign of an operation result output from each output line, and each of the adder selectors may transmit the operation result output from each output line to any one of the adders. For example, an operation result 1110 output from the output line of the first column may be $J_{X1} \times R_{W11} + J_{X2} \times R_{W21} + J_{X3} \times R_{W31} + \ldots + J_{XN} \times R_{WN1}$, which is a MAC operation result for an imaginary element j of each input vector and a real element of each weight vector associated with the first output node. The first sign selector may determine a sign of the operation result 1110 as +, and the first adder selector may transmit the operation result 1110 to the third adder. Further, an operation result 1120 output from the output line of the second column may be $J_{X1} \times I_{W11} + J_{X2} \times I_{W21} + J_{X3} \times I_{W31} + \ldots + J_{XN} \times I_{WN1}$, which is a MAC operation result for the imaginary element j of each input vector and the imaginary element i of each weight vector associated with the first output node. The second sign selector may determine a sign of the operation result 1120 as +, and the second adder selector may transmit the operation result 1120 to the fourth adder. Further, an operation result 1130 output from the output line of the third column may be $J_{X1} \times J_{W11} + J_{X2} \times J_{W21} + J_{X3} \times J_{W31} + \ldots + J_{XN} \times J_{WN1}$, which is a MAC operation result for the imaginary element j of each input vector and the imaginary element j of each weight vector associated with the first output node. The third sign selector may determine a sign of the operation result 1130 as −, and the third adder selector may transmit the operation result 1130 to the first adder. Further, an operation result 1140 output from the output line of the fourth column may be $J_{X1} \times K_{W11} + J_{X2} \times K_{W21} + J_{X3} \times K_{W31} + \ldots + J_{XN} \times K_{WN1}$, which is a MAC operation result for the imaginary element j of each input vector and the imaginary element k of each weight vector associated with the first output node. The fourth sign selector may determine a sign of the operation result 1140 as −, and the fourth adder selector may transmit the operation result 1140 to the second adder.

The above description of the results of operations performed by the output lines of the first to fourth columns and the operation of transmitting the same may apply to the output lines of the other columns likewise. Thus, a further detailed description will be omitted.

Figure 12:
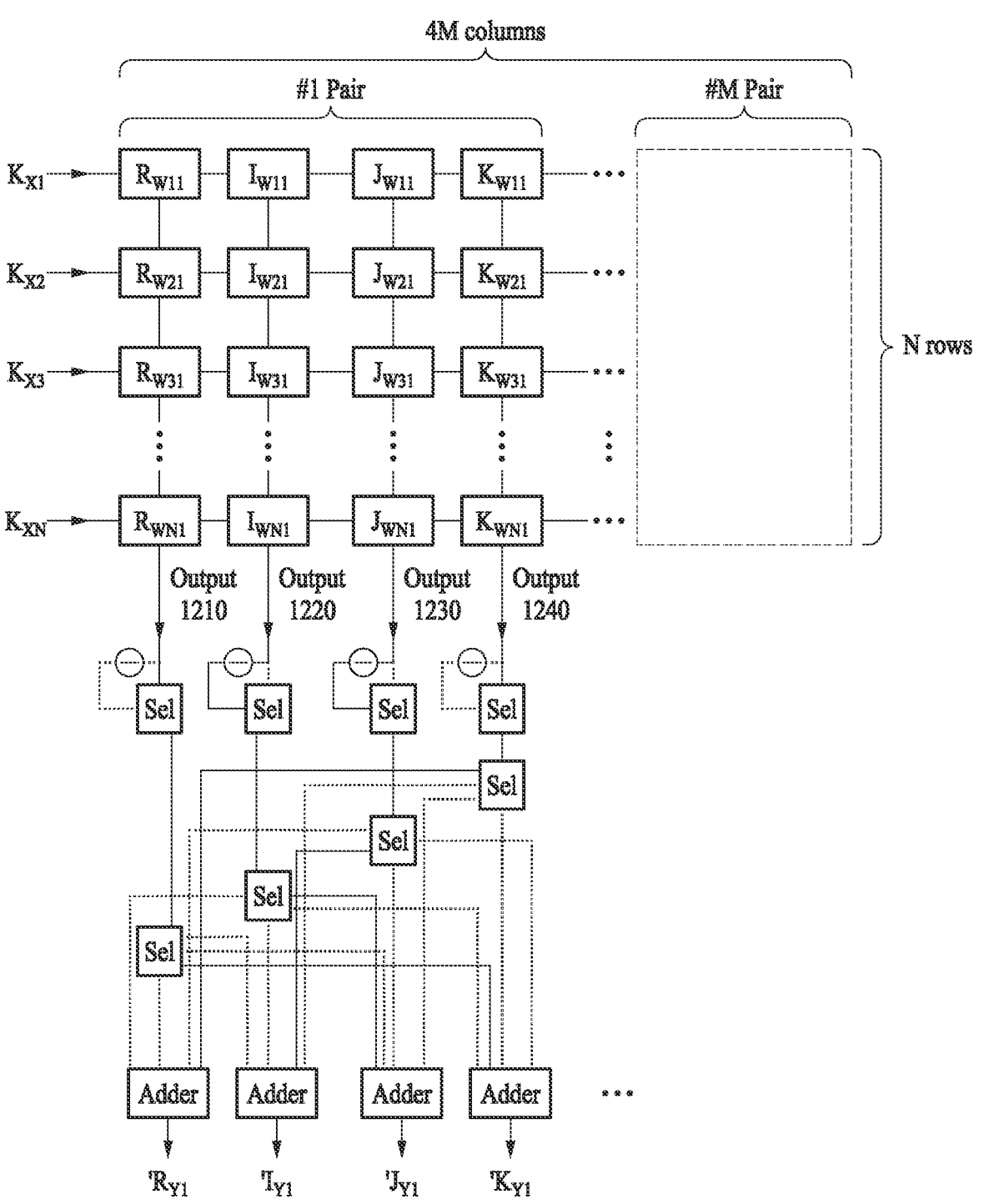

Referring to FIG. 12, the operation of the computing device in a fourth cycle of the quaternion-based MAC operation is illustrated. In the third cycle, an imaginary element k of each of the four-dimensional input vectors may be input to a corresponding input line. The imaginary elements k of respective four-dimensional input vectors input to the input lines may be multiplied by the weight elements stored in the memory cells. For example, the imaginary element $K_{X1}$ of the first input vector input to the input line of the first row may be multiplied by each of the weight elements $R_{W11}$, $I_{W11}$, $J_{W11}$, $K_{W11}$, ..., $R_{W1M}$, $I_{W1M}$, $J_{W1M}$, and $K_{W1M}$ stored in the memory cells connected to the input line of the first row.

Each of the sign selectors may determine a sign of an operation result output from each output line, and each of the adder selectors may transmit the operation result output from each output line to any one of the adders. For example, an operation result 1210 output from the output line of the first column may be $K_{X1} \times R_{W11} + K_{X2} \times R_{W21} + K_{X3} \times R_{W31} + \ldots + K_{XN} \times R_{WN1}$, which is a MAC operation result for an imaginary element k of each input vector and a real element of each weight vector associated with the first output node. The first sign selector may determine a sign of the operation result 1210 as +, and the first adder selector may transmit the operation result 1210 to the fourth adder. Further, an operation result 1220 output from the output line of the second column may be $K_{X1} \times I_{W11} + K_{X2} \times I_{W21} + K_{X3} \times I_{W31} + \ldots + K_{XN} \times I_{WN1}$, which is a MAC operation result for the imaginary element k of each input vector and the imaginary element i of each weight vector associated with the first output node. The second sign selector may determine a sign of the operation result 1220 as −, and the second adder selector may transmit the operation result 1220 to the third adder. Further, an operation result 1230 output from the output line of the third column may be $K_{X1} \times J_{W11} + K_{X2} \times J_{W21} + K_{X3} \times J_{W31} + \ldots + K_{XN} \times J_{WN1}$, which is a MAC operation result for the imaginary element k of each input vector and the imaginary element j of each weight vector associated with the first output node. The third sign selector may determine a sign of the operation result 1230 as −, and the third adder selector may transmit the operation result 1230 to the second adder. Further, an operation result 1240 output from the output line of the fourth column may be $K_{X1} \times K_{W11} + K_{X2} \times K_{W21} + K_{X3} \times K_{W31} + \ldots + K_{XN} \times K_{WN1}$, which is a MAC operation result for the imaginary element k of each input vector and the imaginary element k of each weight vector associated with the first output node. The fourth sign selector may determine a sign of the operation result 1240 as +, and the fourth adder selector may transmit the operation result 1240 to the first adder.

The above description of the results of operations performed by the output lines of the first to fourth columns and the operation of transmitting the same may apply to the output lines of the other columns likewise. Thus, a further detailed description will be omitted.

The adders may determine intermediate operation elements included in an intermediate operation vector by accumulating the operation results received from the adder selectors for the first to fourth cycles with the signs determined through the sign selectors. For example, the operation results accumulated by the first adder for the first to fourth cycles may be determined as a real element '$R_{Y1}$ of a first intermediate operation vector, and the operation results accumulated by the second adder for the first to fourth cycles may be determined as an imaginary element of the first intermediate operation vector. Further, the operation results accumulated by the third adder for the first to fourth cycles may be determined as an imaginary element '$J_{Y1}$ of the first intermediate operation vector, and the operation results accumulated by the fourth adder for the first to fourth cycles may be determined as an imaginary element '$K_{Y1}$ of the first intermediate operation vector.

The computing device may complete a multiplication operation between a quaternion weight vector and a quaternion input vector for four cycles. Based on Equation 4, the computing device may perform a multiplication operation between an intermediate operation vector obtained by the multiplication operation and a conjugate quaternion weight vector for four cycles. A conjugate quaternion vector may have the same magnitude (e.g., the absolute values of a real element and three imaginary elements) as a quaternion vector while including three imaginary elements with signs opposite to those in the quaternion vector (e.g., where the opposite signs are determined by the plurality of sign selectors in FIGS. 13-16). Thus, the crossbar array used for the multiplication operation between the quaternion weight vector and the quaternion input vector may be used as it is. However, the selectors may operate slightly differently.

The real element '$R_{XN}$ and imaginary elements '$I_{XN}$, '$J_{XN}$, and '$K_{XN}$ included in each of intermediate operation vectors may be sequentially input to the input lines for the other four cycles. In a non-limiting example, the real element '$R_{Y1}$ and imaginary elements '$I_{Y1}$, '$J_{Y1}$, and '$K_{Y1}$ may respectively correspond to the real element '$R_{XN}$ and imaginary elements '$I_{XN}$, '$J_{XN}$, and '$K_{XN}$. The output results ('$R_{Ym}$, '$I_{Ym}$, '$J_{Ym}$, and '$K_{Ym}$; m={1, 2, 3, ..., M}) of the first to fourth cycles may be mapped to inputs ('$R_{Xn}$, '$I_{Xn}$, '$J_{Xn}$, and '$K_{Xn}$; n={1, 2, 3, ..., N}) of the fifth to eighth cycles. Accordingly, when M=N, a quaternion-based MAC operation of one or more embodiments may be performed by a single crossbar array without an additional storage device, even for a crossbar array for a complex value-based MAC operation.

Figure 13:
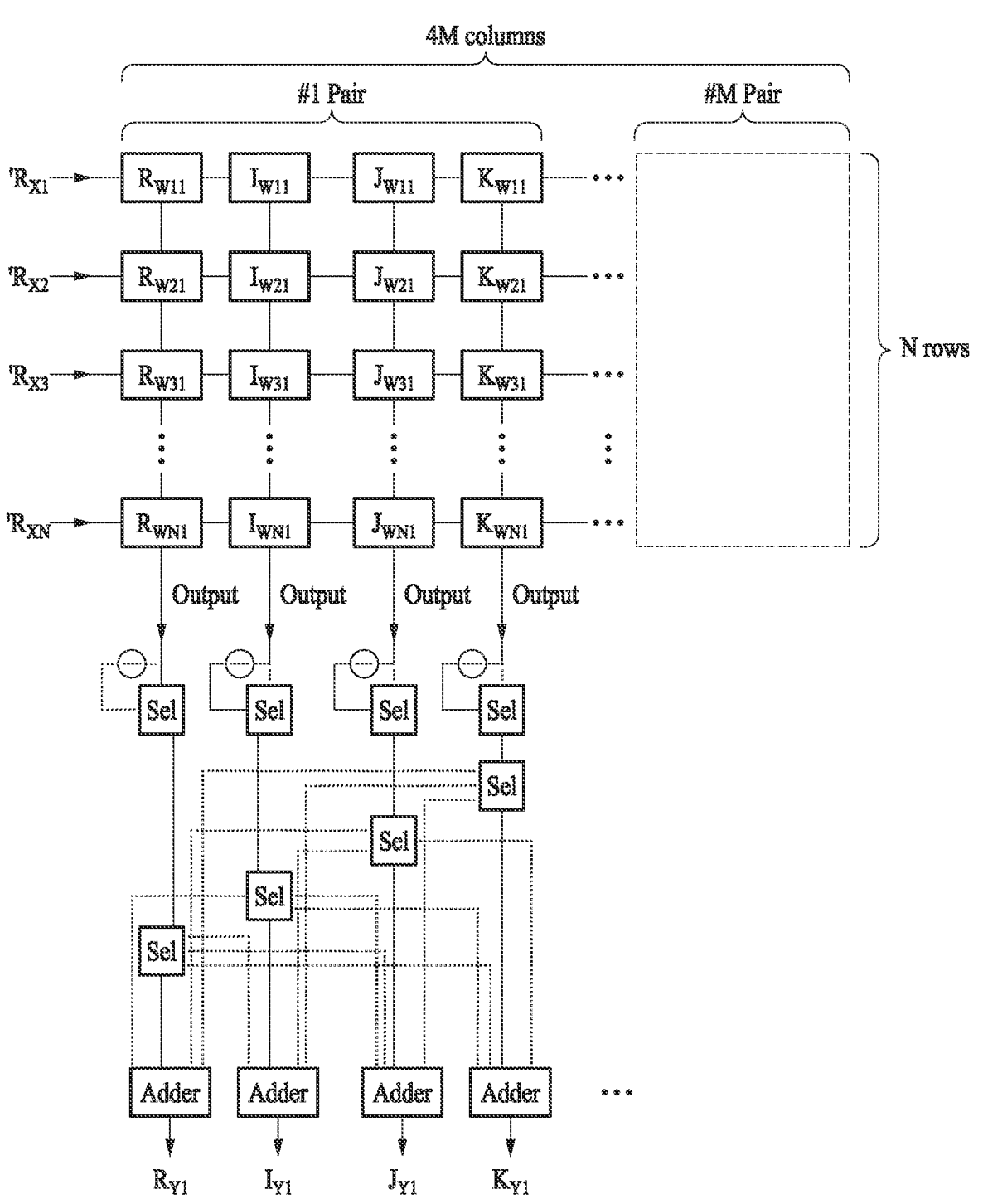

For example, referring to FIG. 13, the operation of the computing device in a fifth cycle of the quaternion-based MAC operation is illustrated. In the fifth cycle, a real element of each of a four-dimensional intermediate operation vectors may be input to a corresponding input line and multiplied by the weight elements stored in the memory cells. Each of the sign selectors may determine a sign of an operation result output from each output line, and each of the adder selectors may transmit the operation result output from each output line to any one of the adders. Since the sign selectors and the adder selectors may operate along the solid lines shown in FIG. 13, a further detailed description will be omitted.

Figure 14:
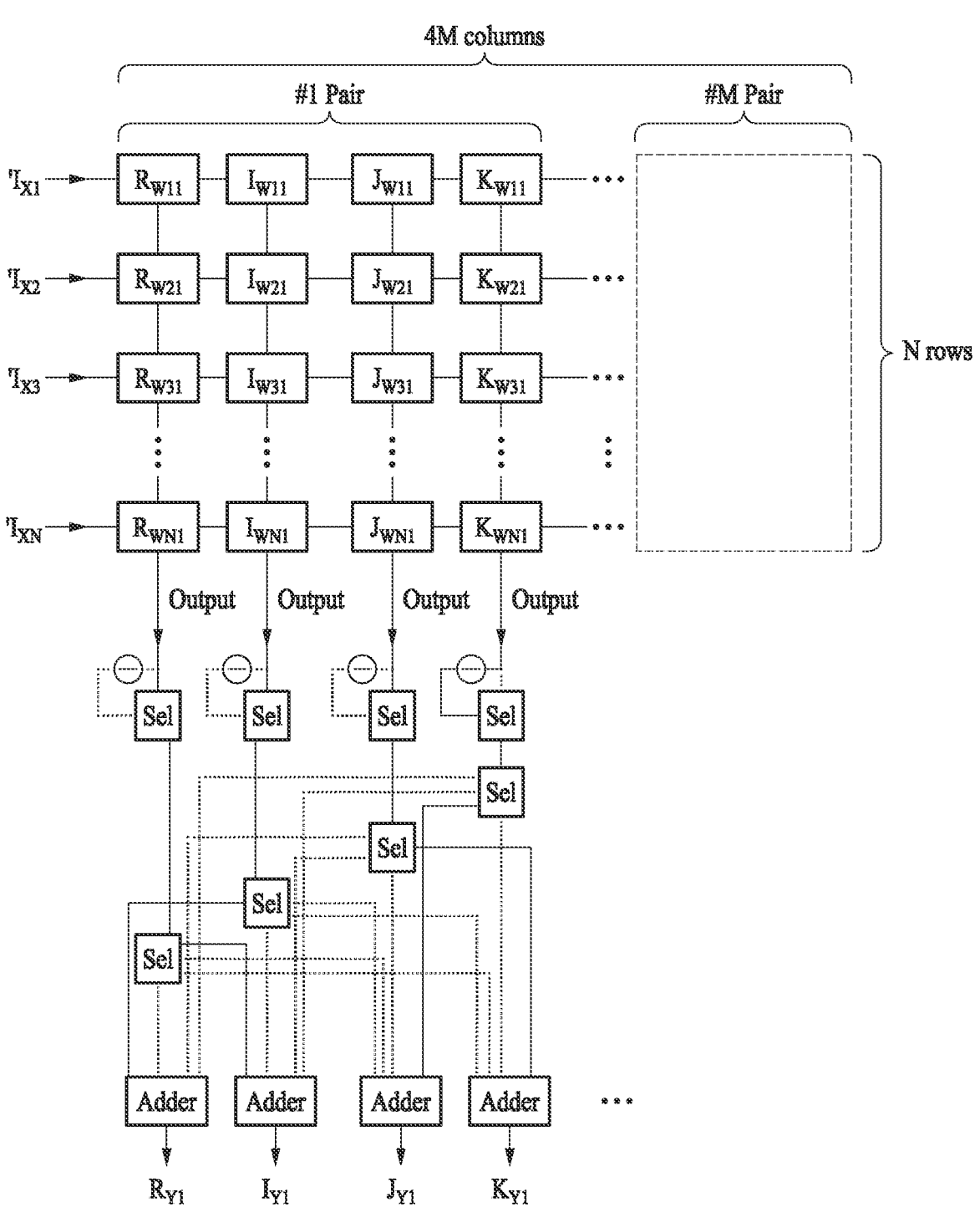

Referring to FIG. 14, the operation of the computing device in a sixth cycle of the quaternion-based MAC operation is illustrated. In the sixth cycle, an imaginary element 'i of each of the four-dimensional intermediate operation vectors may be input to a corresponding input line and multiplied by the weight elements stored in the memory cells. Each of the sign selectors may determine a sign of an operation result output from each output line, and each of the adder selectors may transmit the operation result output from each output line to any one of the adders. Since the sign selectors and the adder selectors may operate along the solid lines shown in FIG. 14, a further detailed description will be omitted.

Figure 15:
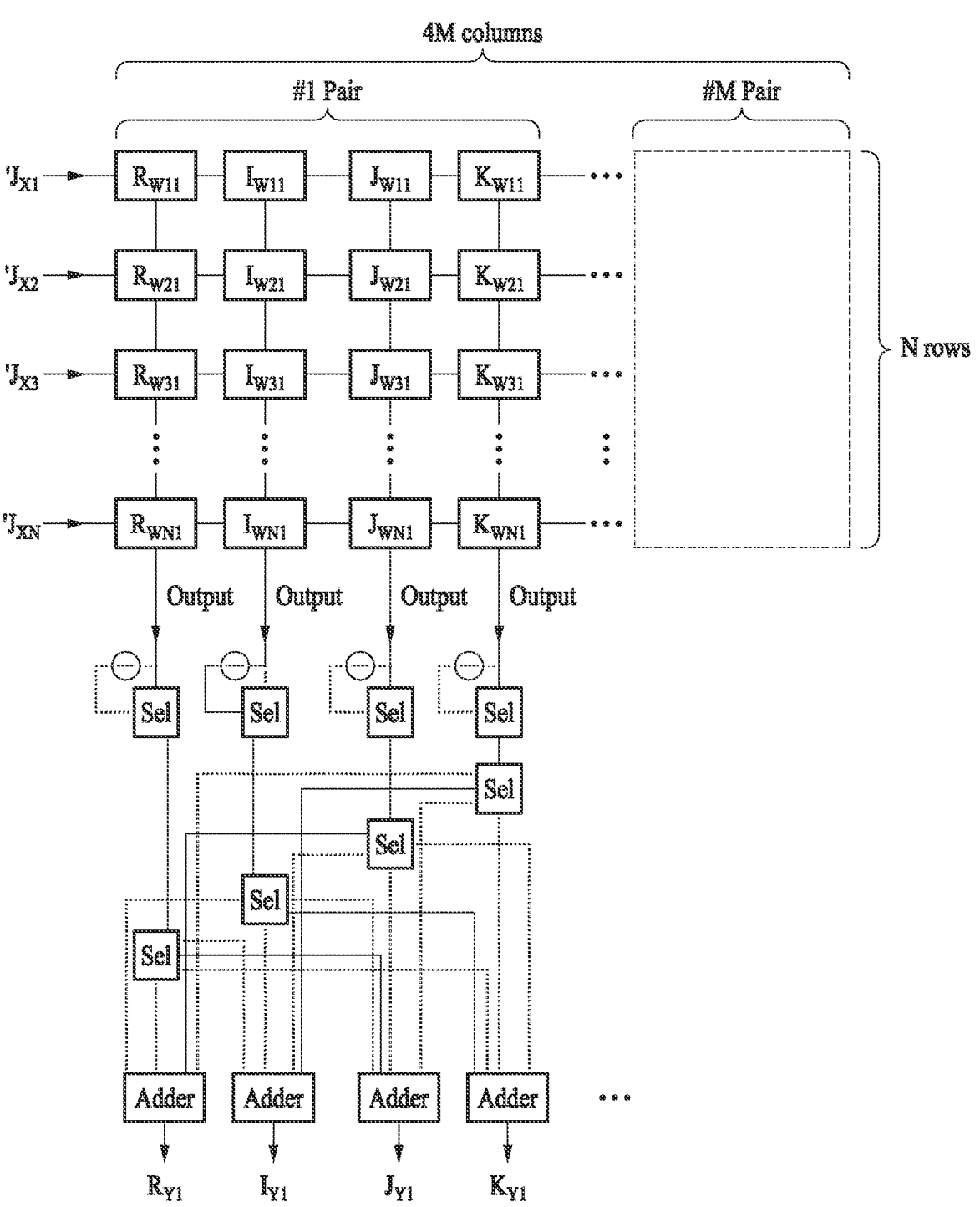

Referring to FIG. 15, the operation of the computing device in a seventh cycle of the quaternion-based MAC operation is illustrated. In the seventh cycle, an imaginary element 'j of each of the four-dimensional intermediate operation vectors may be input to a corresponding input line and multiplied by the weight elements stored in the memory cells. Each of the sign selectors may determine a sign of an operation result output from each output line, and each of the adder selectors may transmit the operation result output from each output line to any one of the adders. Since the sign selectors and the adder selectors may operate along the solid lines shown in FIG. 15, a further detailed description will be omitted.

Figure 16:
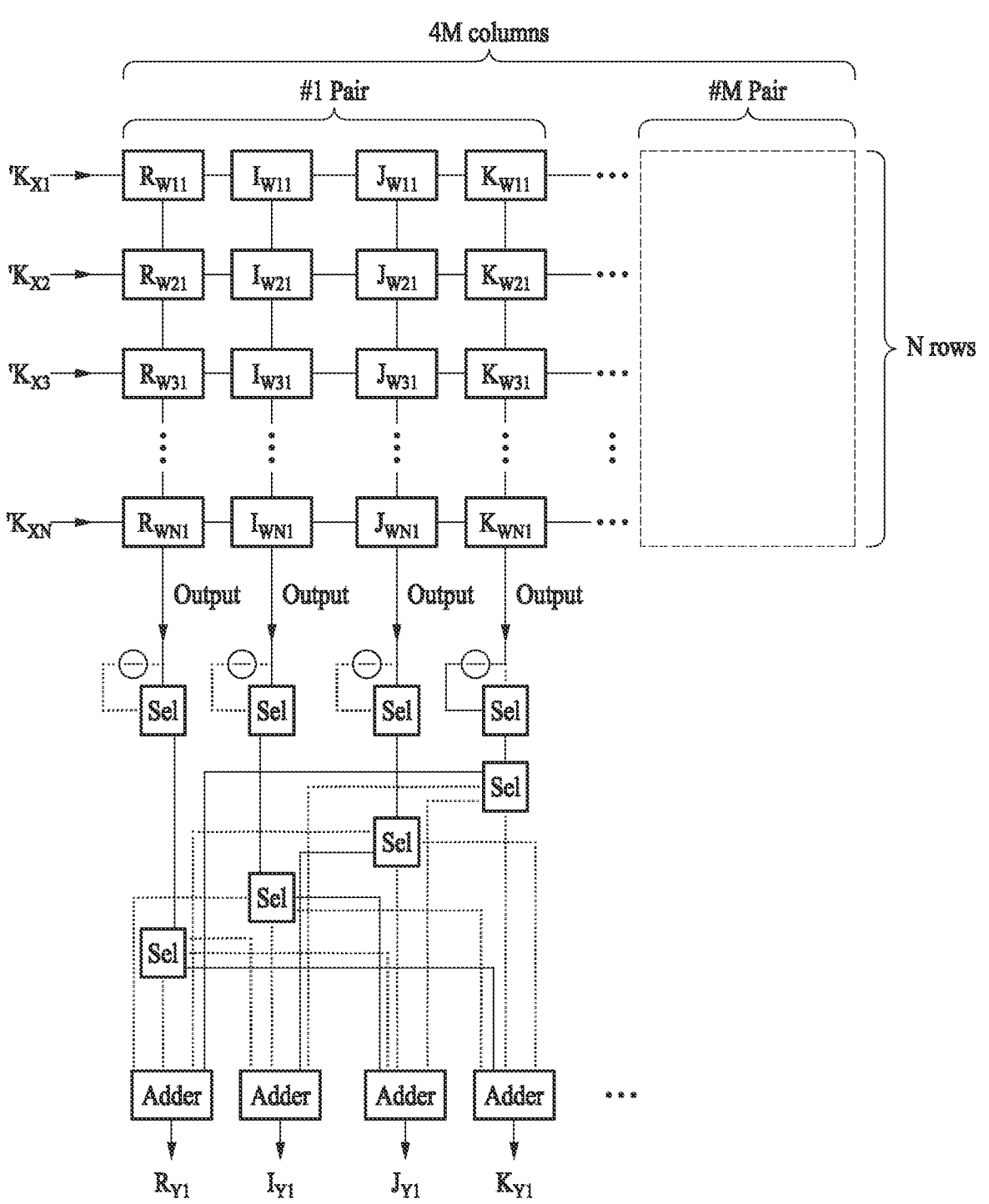

Referring to FIG. 16, the operation of the computing device in an eighth cycle of the quaternion-based MAC operation is illustrated. In the eighth cycle, an imaginary element 'k of each of the four-dimensional intermediate operation vectors may be input to a corresponding input line and multiplied by the weight elements stored in the memory cells. Each of the sign selectors may determine a sign of an operation result output from each output line, and each of the adder selectors may transmit the operation result output from each output line to any one of the adders. Since the sign selectors and the adder selectors may operate along the solid lines shown in FIG. 16, a further detailed description will be omitted.

The adders may determine output elements included in a four-dimensional output vector by accumulating the operation results received from the adder selectors for the fifth to eighth cycles with the signs determined through the sign selectors. For example, the operation results accumulated by the first adder for the fifth to eighth cycles may be determined as a real element $R_{Y1}$ of a first output vector, and the operation results accumulated by the second adder for the fifth to eighth cycles may be determined as an imaginary element $I_{Y1}$ of the first output vector. Further, the operation results accumulated by the third adder for the fifth to eighth cycles may be determined as an imaginary element $J_{Y1}$ of the first output vector, and the operation results accumulated by the fourth adder for the fifth to eighth cycles may be determined as an imaginary element Kyi of the first output vector.

As such, the computing device of one or more embodiments may effectively obtain quaternion-based MAC operation results with the eight-cycle operation of the computing device, thereby improving upon typical computing devices which may obtain quaternion-based MAC operation results with a greater amount of cycles and/or operations.

Figure 17:
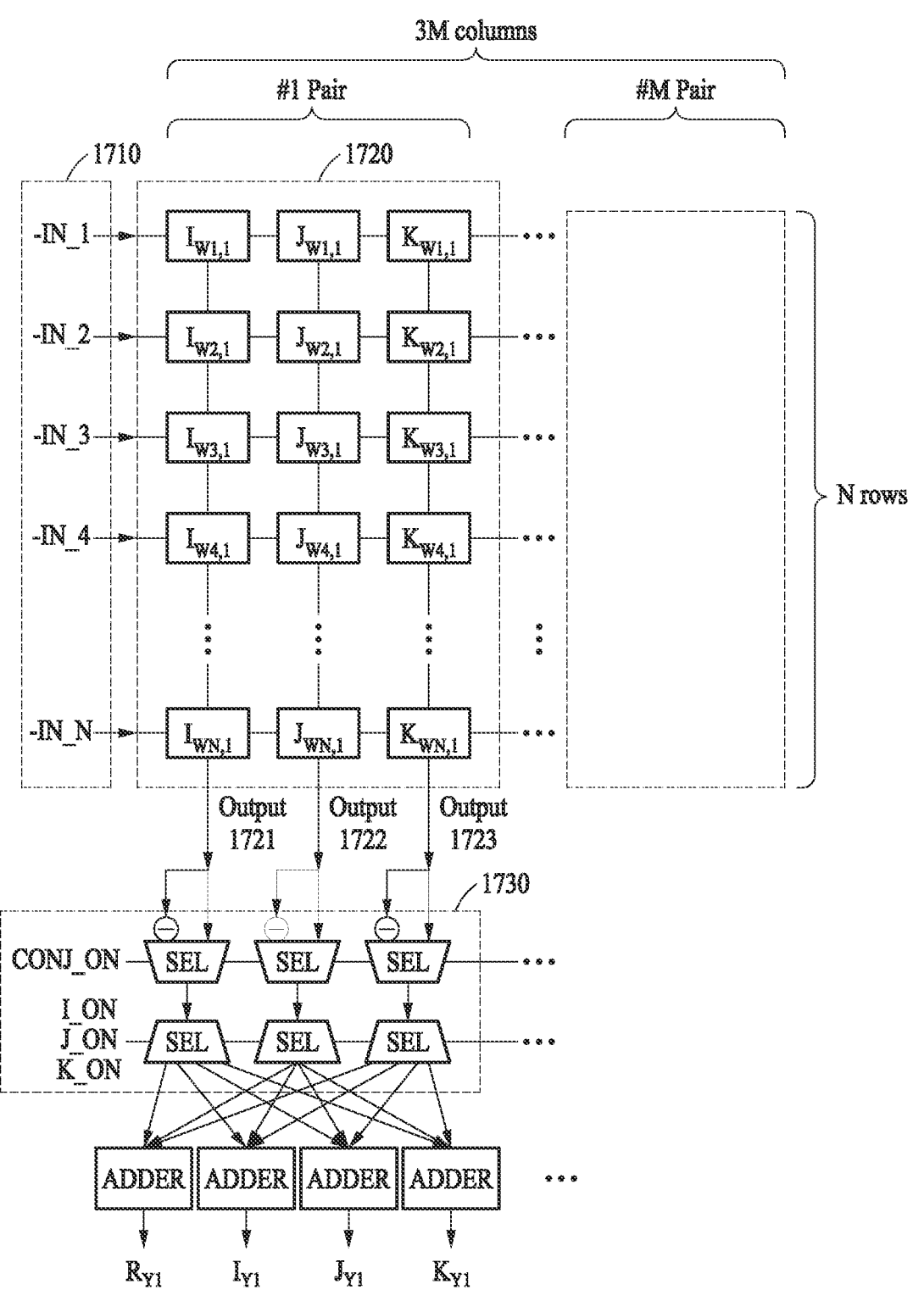
FIG. 17 illustrates an example of a structure and operation of a computing device for a quaternion neural network.

FIG. 17 illustrates an example of a structure and operation of a computing device for a quaternion neural network.

Referring to FIG. 17, a computing device for performing a three-dimensional vector-based MAC operation is illustrated. Many applications, such as space recognition and image recognition, may use a three-dimensional vector-based MAC operation. However, since a quaternion vector is four-dimensional, a MAC operation using a real element of "0" and three imaginary elements in the quaternion vector may be performed. In other words, input vectors, weight vectors, and output vectors may be quaternion vectors including a real element of "0".

A computing device for performing a three-dimensional vector-based MAC operation may include a crossbar array, sign selectors, adder selectors, and adders. The crossbar array may include N input lines to which three-dimensional input vectors 1710 are input, 3M output lines intersecting the input lines, and N×3M memory cells disposed at intersecting points between the input lines and the output lines.

Weight elements included in each of the three-dimensional weight vectors may be stored in reference memory cells that connect a corresponding single reference input line and corresponding three reference output lines. For example, an imaginary element $I_{W1,1}$ in a weight vector $W_{1,1}$ may be stored in a memory cell disposed at an intersecting point between an input line of a first row and an output line of a first column. An imaginary element $J_{W1,1}$ in the weight vector $W_{1,1}$ may be stored in a memory cell disposed at an intersecting point between the input line of the first row and an output line of a second column. An imaginary element $K_{W1,1}$ in the weight vector $W_{1,1}$ may be stored in a memory cell disposed at an intersecting point between the input line of the first row and an output line of a third column. In other words, weight elements (e.g., three imaginary elements) included in each of the three-dimensional weight vectors may be stored in reference memory cells connected to different reference output lines.

Meanwhile, each of the input lines may correspond to one input node, while three of the output lines may correspond to one output node. When there are M output nodes, the crossbar array may include 3M output lines. Memory cells connected to a first output line of three output lines 1720 corresponding to one output node may store imaginary elements i of weight vectors connected to the corresponding output node. Memory cells connected to a second output line may store imaginary elements j of the weight vectors connected to the corresponding output node. Memory cells connected to a third output line may store imaginary elements k of the weight vectors connected to the corresponding output node. A pair of three output lines may correspond to one output node.

While examples of the computing device for performing a complex value-based MAC operation may include selectors and adders as described above, the computing device for performing a three-dimensional vector-based MAC operation may additionally or alternatively include sign selectors and adder selectors 1730. A + or − sign of an operation result output from each output line may be determined by a corresponding sign selector, and the operation result with the determined sign may be transmitted to any one of the adders by a corresponding adder selector. According to non-limiting examples, the computing device for performing a three-dimensional vector-based MAC operation may include the components of the computing device for performing a complex value-based MAC operation, and thus may be configured to perform both the complex value-based MAC operation and the three-dimensional vector-based MAC operation.

Each of the sign selectors may determine a sign of an operation result output from an output line by a control signal CONJ_ON (conjunction on). For example, when the control signal is "0" (or low), the sign may be determined as +, and when the control signal is "1" (or high), the sign may be determined as −. However, in some examples, the signs may be determined reversely. The control signal may be determined based on whether what is applied to an operation performed in a corresponding cycle is a weight vector or a conjugate weight vector, and which vectors are subject to a multiplication performed by a corresponding output line (e.g., whether the multiplication is a multiplication between an imaginary element i and an imaginary element i).

Each of the adder selectors may determine any one of the adders to which the operation result output from the corresponding output line is to be transmitted, based on control signals I_ON, J_ON, and K_ON. The control signal I_ON may be "1" when an input element that is input in a corresponding cycle is an imaginary element i, and may be "0" when not. The control signal J_ON may be "1" when an input element that is input in a corresponding cycle is an imaginary element j, and may be "0" when not. The control signal K_ON may be "1" when an input element that is input in a corresponding cycle is an imaginary element k, and may be "0" when not.

The three-dimensional vector-based MAC operation using a quaternion including a real element of "0" may be expressed by Equation 5 below, for example.

$$Y_m = \Sigma\left(W_{NM} \otimes X_N \otimes W_{NM}^{-1}\right) \qquad \text{Equation 5}$$
$$= \Sigma((I_{WNM} \cdot i + J_{WNM} \cdot j + K_{WNM} \cdot k) \otimes$$
$$(I_{XN} \cdot i + J_{XN} \cdot j + K_{XN} \cdot k) \otimes$$
$$(-I_{WNM} \cdot i - J_{WNM} \cdot j - K_{WNM} \cdot k))$$

In Equation 5 above, $W_{NM}$ denotes a weight vector, $X_N$ denotes an input vector, $W^{-1}_{NM}$ denotes a conjugate weight vector, and $\otimes$ denotes the Hamilton product.

In Equation 5 above, $(I_{WNM} \cdot i + J_{WNM} \cdot j + K_{WNM} \cdot k) \otimes (I_{XN} \cdot i \cdot J_{XN} \cdot j + K_{XN} \cdot k)$, a multiplication operation between the weight vector and the input vector, may be expressed by Equation 6 below, for example.

$$(I_{WNM} \cdot i + J_{WNM} \cdot j + K_{WNM} \cdot k) \otimes (I_{XN} \cdot i + J_{XN} \cdot j + K_{XN} \cdot k) = \quad \text{Equation 6}$$

$$(-I_{WNM} \cdot I_{XN} - J_{WNM} \cdot J_{XN} - K_{WNM} \cdot K_{XN}) +$$

$$(J_{WNM} \cdot K_{XN} - K_{WNM} \cdot J_{XN}) \cdot i +$$

$$(-I_{WNM} \cdot K_{XN} + K_{WNM} \cdot I_{XN}) \cdot j + (I_{WNM} \cdot J_{XN} - J_{WNM} \cdot I_{XN}) \cdot k$$

The multiplication operation between the weight vector and the input vector expressed by Equation 6 above may be performed by the computing device for first to third cycles.

In the first cycle, an imaginary element i of each of the three-dimensional input vectors 1710 may be input to a corresponding input line. The imaginary elements i of respective three-dimensional input vectors input to the input lines may be multiplied by weight elements stored in memory cells. For example, an imaginary element $I_{X1}$ of a first input vector input to an input line of a first row may be multiplied by each of the weight elements $I_{W11}$, $J_{W11}$, $K_{W11}$, . . . , $I_{W1M}$, $J_{W1M}$, and $K_{W1M}$ stored in memory cells connected to the input line of the first row.

An operation result 1721 output from an output line of a first column corresponds to $I_{WNM} \cdot I_{XN}$ in Equation 6, and may be applied a − sign by a corresponding sign selector. An operation result 1722 output from an output line of a second column corresponds to $J_{WNM} \cdot I_{XN}$ in Equation 6, and may be applied a − sign by a corresponding sign selector. An operation result 1723 output from an output line of a third column corresponds to $K_{WNM} \cdot I_{XN}$ in Equation 6, and may be applied a + sign by a corresponding sign selector.

In the second cycle, an imaginary element j of each of the three-dimensional input vectors 1710 may be input to a corresponding input line. The imaginary elements j of respective three-dimensional input vectors input to the input lines may be multiplied by the weight elements stored in the memory cells.

An operation result 1721 output from the output line of the first column corresponds to $I_{WNM} \cdot J_{XN}$ in Equation 6, and may be applied a + sign by a corresponding sign selector. An operation result 1722 output from the output line of the second column corresponds to $J_{WNM} \cdot J_{XN}$ in Equation 6, and may be applied a − sign by a corresponding sign selector. An operation result 1723 output from the output line of the third column corresponds to $K_{WNM} \cdot J_{XN}$ in Equation 6, and may be applied a − sign by a corresponding sign selector.

In the third cycle, an imaginary element k of each of the three-dimensional input vectors 1710 may be input to a corresponding input line. The imaginary elements k of respective three-dimensional input vectors input to the input lines may be multiplied by the weight elements stored in the memory cells.

An operation result 1721 output from the output line of the first column corresponds to $I_{WNM} \cdot K_{XN}$ in Equation 6, and may be applied a − sign by a corresponding sign selector. An operation result 1722 output from the output line of the second column corresponds to $J_{WNM} \cdot K_{XN}$ in Equation 6, and may be applied a + sign by a corresponding sign selector. An operation result 1723 output from the output line of the third column corresponds to $K_{WNM} \cdot K_{XN}$ in Equation 6, and may be applied a − sign by a corresponding sign selector.

A value accumulated by each adder for first to third cycles may be included in an intermediate operation vector as an intermediate operation element. As seen in Equation 6, the intermediate operation vector may be a four-dimensional vector including one real element and three imaginary elements. The real element of the intermediate operation vector may be expressed by $R^*_{YM}$, the imaginary element i may be expressed by Gm, the imaginary element j may be expressed by $J^*_{YM}$, and the imaginary element k may be expressed by $K^*_{YM}$.

A multiplication operation between the intermediate operation vector and the conjugate weight vector may be expressed by Equation 7 below, for example.

$$(R^*_{YM} + I^*_{YM} \cdot i + J^*_{YM} \cdot j + K^*_{YM} \cdot k) \otimes \quad \text{Equation 7}$$

$$(-I_{WNM} \cdot i - J_{WNM} \cdot j - K_{WNM} \cdot k) =$$

$$(-R^*_{YM} \cdot I_{WNM} - J^*_{YM} \cdot K_{WNM} + K^*_{YM} \cdot J_{WNM}) \cdot i +$$

$$(-R^*_{YM} \cdot J_{WNM} + I^*_{YM} \cdot K_{WNM} - K^*_{YM} \cdot I_{WNM}) \cdot j +$$

$$(-R^*_{YM} \cdot K_{WNM} - I^*_{YM} \cdot J_{WNM} + J^*_{YM} \cdot I_{WNM}) \cdot k$$

The multiplication operation between the intermediate operation vector and the conjugate weight vector expressed by Equation 7 above may be performed by the computing device for fourth to seventh cycles. The intermediate operation elements included in each of the four-dimensional intermediate operation vectors may be sequentially input to the input lines for the fourth to seventh cycles.

In the fourth cycle, a real element of each of the four-dimensional input vectors 1710 may be input to a corresponding input line. The real elements of respective four-dimensional input vectors input to the input lines may be multiplied by weight elements stored in memory cells.

An operation result 1721 output from the output line of the first column corresponds to $R^*_{YM} \cdot I_{WNM}$ in Equation 7, and may be applied a − sign by a corresponding sign selector. An operation result 1722 output from the output line of the second column corresponds to $R^*_{YM} \cdot J_{WNM}$ in Equation 7, and may be applied a − sign by a corresponding sign selector. An operation result 1723 output from the output line of the third column corresponds to $R^*_{YM} \cdot K_{WNM}$ in Equation 7, and may be applied a − sign by a corresponding sign selector.

In the fifth cycle, an imaginary element i of each of the four-dimensional input vectors 1710 may be input to a corresponding input line. The imaginary elements i of respective four-dimensional input vectors input to the input lines may be multiplied by the weight elements stored in the memory cells.

An operation result 1722 output from the output line of the second column corresponds to $I^*_{YM} \cdot J_{WNM}$ in Equation 7, and may be applied a − sign by a corresponding sign selector. An operation result 1723 output from the output line of the third column corresponds to $I^*_{YM} \cdot K_{WNM}$ in Equation 7, and may be applied a + sign by a corresponding sign selector.

In the sixth cycle, an imaginary element j of each of the four-dimensional input vectors 1710 may be input to a corresponding input line. The imaginary elements j of respective four-dimensional input vectors input to the input lines may be multiplied by the weight elements stored in the memory cells.

An operation result 1721 output from the output line of the first column corresponds to $J^*_{YM} \cdot I_{WNM}$ in Equation 7, and may be applied a + sign by a corresponding sign selector. An operation result 1723 output from the output line of the third column corresponds to $J^*_{YM} \cdot K_{WNM}$ in Equation 7, and may be applied a − sign by a corresponding sign selector.

In the seventh cycle, an imaginary element k of each of the four-dimensional input vectors 1710 may be input to a corresponding input line. The imaginary elements k of respective four-dimensional input vectors input to the input lines may be multiplied by the weight elements stored in the memory cells.

An operation result 1721 output from the output line of the first column corresponds to $K^*_{YM} \cdot I_{WNM}$ in Equation 7, and may be applied a − sign by a corresponding sign selector. An operation result 1722 output from the output line of the second column corresponds to $K^*_{YM} \cdot J_{WNM}$ in Equation 7, and may be applied a + sign by a corresponding sign selector.

A value accumulated by each adder for fourth to seventh cycles may be included in an output vector as an output element. As seen in Equation 7, the output vector may be a three-dimensional vector including three imaginary elements. The imaginary element i of the output vector may be expressed $I_{YM}$, the imaginary element j may be expressed by $J_{YM}$, and the imaginary element k may be expressed by $K_{YM}$.

Meanwhile, when the complex value-based MAC operation and the quaternion-based MAC operation are performed in the computing device described above, the number (e.g., the total or predetermined number) of memory cells for storing weight vectors increases by two to four times compared to the RVNN, which may be considered as poor area efficiency. However, a CVNN-based neural network model may reduce the number of nodes to ½ compared to an RVNN-based neural network model, such that the number of weights may be reduced to ¼. In other words, when the RVNN-based neural network model uses N one-dimensional weights, the CVNN-based neural network model uses N/4 two-dimensional weights and thus, may have a crossbar array area reduced to ½ compared to the RVNN even when storing one two-dimensional weight in two memory cells.

Further, a QNN-based neural network model may reduce the number of nodes to ¼ compared to the RVNN-based neural network model, such that the number of weights may be reduced to ⅟₁₆. In other words, when the RVNN-based neural network model uses N one-dimensional weights, the QNN-based neural network model uses N/16 four-dimensional weights and thus, may have a crossbar array area reduced to ¼ compared to the RVNN even when storing one four-dimensional weight in four memory cells.

Figure 18:
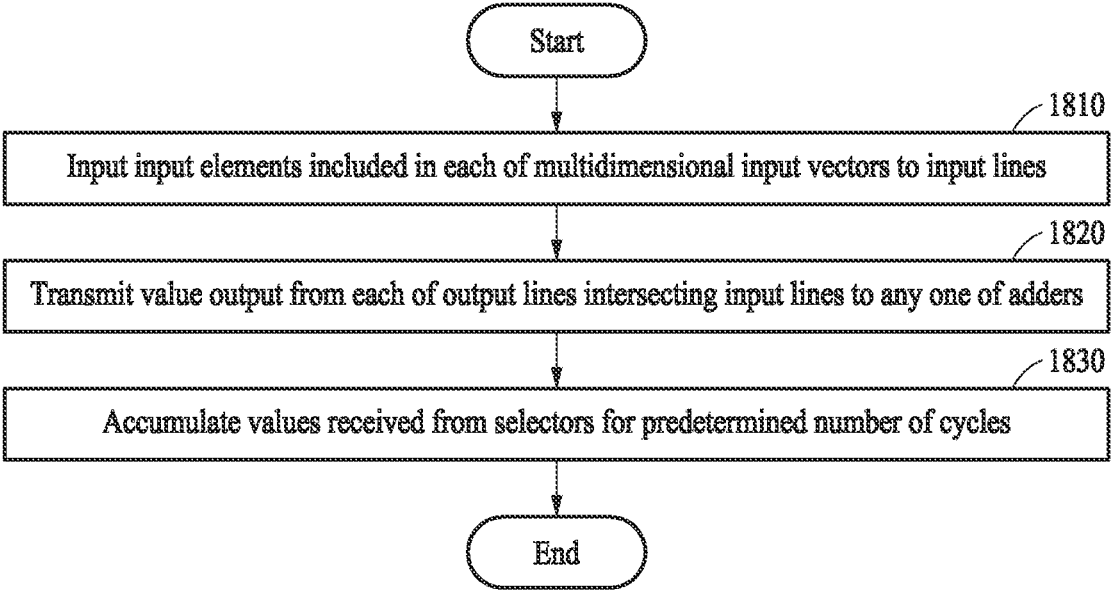
FIG. 18 illustrates an example of an operation method of a computing device.

FIG. 18 illustrates an example of an operation method of a computing device.

In operation 1810, a computing device may input input elements included in each of multidimensional input vectors to input lines. The computing device may sequentially input the input elements included in each multidimensional input vector to the same reference input line for cycles.

In operation 1820, the computing device may transmit, through selectors, a value output from each of output lines intersecting the input lines to any one of adders. The computing device may sort, through reference selectors corresponding to reference output lines among the selectors, a value output from each of the reference output lines by output elements of each of multidimensional output vectors and transmit the sorted value to different reference adders.

In operation 1830, the computing device may accumulate, through the adders, values received from the selectors for a predetermined number of cycles. The number of cycles may be equal to the number of input elements included in each of the multidimensional input vectors.

Weight elements included in each of multidimensional weight vectors applied to a multidimensional vector neural network may be stored in reference memory cells that connect a corresponding single reference input line and corresponding two or more reference output lines. The weight elements included in each of the multidimensional weight vectors may be stored in reference memory cells connected to different reference output lines.

Output elements included in each of the multidimensional output vectors may be determined based on a value accumulated by each of the reference adders corresponding to the reference output lines.

The number (e.g., total number) of output lines may be determined based on the number of multidimensional weight vectors and the number of weight elements included in each of the multidimensional weight vectors.

The descriptions provided with reference to FIGS. 1 to 17 may apply to the operations shown in FIG. 18, and thus a further detailed description will be omitted.

Figure 19:
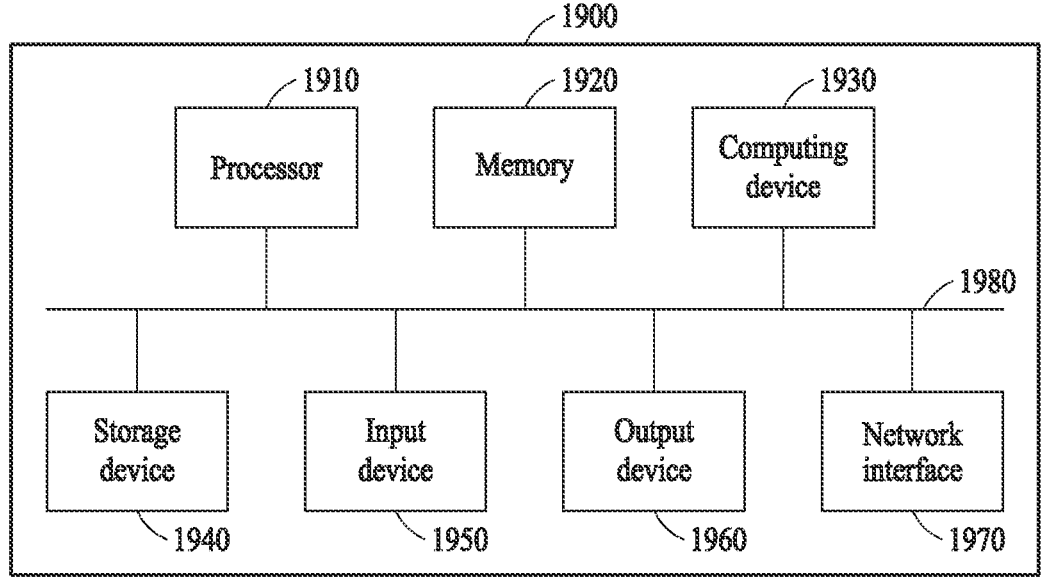
FIG. 19 illustrates an example of an electronic device.

FIG. 19 illustrates an example of an electronic device.

Referring to FIG. 19, an electronic device 1900 may include a processor 1910 (e.g., one or more processors), a memory 1920 (e.g., one or more memories), a computing device 1930, a storage device 1940, an input device 1950, an output device 1960, and a network interface 1970 that may communicate with each other through a communication bus 1980. For example, the electronic device 1900 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as an autonomous vehicle or a smart vehicle. The electronic device 1900 may perform one or more or all of the above-described multidimensional vector-based MAC operations through the computing device 1930.

The processor 1910 may execute instructions or functions to be executed in the electronic device 1900. For example, the processor 1910 may process the instructions stored in the memory 1920 or the storage device 1940. The processor 1910 may perform one or more or all of the operations described through FIGS. 1 to 18. The memory 1920 may include a computer-readable storage medium or a computer-readable storage device. The memory 1920 may store instructions to be executed by the processor 1910 and may store related information while software and/or an application is executed by the electronic device 1900.

The storage device 1940 may store a more quantity of information than the memory 1920 for a long time. For example, the storage device 1940 may include a magnetic hard disk, an optical disk, a flash memory, a floppy disk, or other non-volatile memories known in the art.

The input device 1950 may receive an input from the user in traditional input manners through a keyboard and a mouse, and in new input manners such as a touch input, a voice input, and an image input. For example, the input device 1950 may include a keyboard, a mouse, a touch screen, a microphone, or any other device that detects the input from the user and transmits the detected input to the electronic device 1900. The output device 1960 may provide an output of the electronic device 1900 to the user through a visual, auditory, or tactile channel. The output device 1960 may include, for example, a display, a touch screen, a speaker, a vibration generator, or any other device that provides the output to the user. The network interface 1970 may communicate with an external device through a wired or wireless network.

The in-memory computing circuits, analog crossbar arrays, row lines, column lines, memory cells, ADCs, output lines, selectors, first selectors, second selectors, adders, first adders, second adders, adder selectors, electronic devices, processors, memories, computing devices, storage devices, input devices, output devices, network interfaces, communication buses, in-memory computing circuit 300, analog crossbar array 310, row lines 311, column lines 312, memory cells 313, ADCs 320, output lines 520, selectors 530, first selector 630, second selector 640, first adder 650, second adder 660, first selector 730, second selector 740, first adder 750, second adder 760, output lines 1720, adder selectors 1730, electronic device 1900, processor 1910, memory 1920, computing device 1930, storage device 1940, input device 1950, output device 1960, network interface 1970, communication bus 1980, and other apparatuses, devices, units, modules, and components described herein with respect to FIGS. 1-19 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A computing device for a multidimensional vector neural network, the computing device comprising:
  input lines to which multidimensional input vectors are input;
  output lines intersecting the input lines;
  memory cells disposed at intersecting points between the input lines and the output lines and configured to store weight elements included in multidimensional weight vectors;
  selectors configured to transmit a value output from each of the output lines to any one of adders; and
  the adders configured to accumulate values received from the selectors in a predetermined number of cycles,
  wherein, for each of the multidimensional weight vectors, weight elements included in the multidimensional weight vector are stored in reference memory cells that connect a corresponding single reference input line and corresponding two or more reference output lines.

2. The device of claim 1, wherein, for each of the multidimensional input vectors, input elements included in the multidimensional input vector are sequentially input to a same reference input line in the cycles.

3. The device of claim 1, wherein the predetermined number of cycles is equal to a number of input elements included in each of the multidimensional input vectors.

4. The device of claim 1, wherein, for each of multidimensional output vectors, output elements included in the multidimensional output vector are determined based on a value accumulated by each of reference adders corresponding to the reference output lines.

5. The device of claim 1, wherein reference selectors corresponding to the reference output lines among the selectors are configured to sort a value output from each of the reference output lines by output elements of each of multidimensional output vectors and transmit the sorted value to different reference adders.

6. The device of claim 1, wherein a number of output lines is determined based on a number of multidimensional weight vectors and a number of weight elements included in each of the multidimensional weight vectors.

7. The device of claim 1, wherein, for each of the multidimensional weight vectors, the weight elements included in the multidimensional weight vector are stored in reference memory cells connected to different reference output lines.

8. The device of claim 1, wherein the multidimensional input vectors, the multidimensional weight vectors, and multidimensional output vectors determined based on a value accumulated by each of the adders are complex vectors comprising a real element and an imaginary element.

9. The device of claim 8, wherein
  a value output from a first reference output line connected to memory cells configured to store real elements among the reference output lines is transmitted to a second reference adder configured to accumulate imaginary elements, wherein a sign of the value is maintained through a first reference selector, and
  another value output from a second reference output line connected to memory cells configured to store imaginary elements among the reference output lines is transmitted to a first reference adder configured to accumulate real elements, wherein a sign of the other value is inverted through a second reference selector.

10. The device of claim 1, wherein the multidimensional input vectors, the multidimensional weight vectors, and multidimensional output vectors determined based on a value accumulated by each of the adders are either one or both of quaternion vectors comprising imaginary elements and quaternion vectors comprising a real element and imaginary elements.

11. The device of claim 10, further comprising:
  second selectors configured to determine a sign of a value output from each of the output lines based on a type of a multidimensional weight vector applied to an operation to be performed in each cycle, a type of a weight element stored in the memory cells, and a type of an input element input to the input lines and transmit the value with the determined sign to a corresponding selector.

12. The device of claim 10, wherein elements included in each of partial operation result vectors accumulated by the adders in a portion of the cycles are sequentially input to the input lines in the remaining portion of the cycles.

13. The device of claim 1, wherein the predetermined number of cycles is
  "2" in response to the multidimensional weight vectors being complex vectors, and
  "7" or "8" in response to the multidimensional weight vectors being quaternion vectors.

14. A processor-implemented operation method of a computing device for a multidimensional vector neural network, the operation method comprising:
  inputting input elements included in each of multidimensional input vectors to input lines;
  transmitting, through selectors, a value output from each of output lines intersecting the input lines to any one of adders; and
  accumulating, through the adders, values received from the selectors in a predetermined number of cycles,
  wherein, for each of the multidimensional weight vectors applied to the multidimensional vector neural network, weight elements included in the multidimensional weight vector are stored in reference memory cells that connect a corresponding single reference input line and corresponding two or more reference output lines.

15. The method of claim 14, wherein, for each of the multidimensional input vectors, the inputting comprises sequentially inputting input elements included in the multidimensional input vector to a same reference input line in the cycles.

16. The method of claim 14, wherein the predetermined number of cycles is equal to a number of input elements included in each of the multidimensional input vectors.

17. The method of claim 14, wherein, for each of multidimensional output vectors, output elements included in the multidimensional output vector are determined based on a value accumulated by each of reference adders corresponding to the reference output lines.

18. The method of claim 14, wherein the transmitting comprises sorting, through reference selectors corresponding to the reference output lines among the selectors, a value output from each of the reference output lines by output elements of each of the multidimensional output vectors and transmitting the sorted value to different reference adders.

19. The method of claim 14, wherein a number of output lines is determined based on a number of multidimensional weight vectors and a number of weight elements included in each of the multidimensional weight vectors.

20. The method of claim 14, wherein, for each of the multidimensional weight vectors, the weight elements included in the multidimensional weight vector are stored in reference memory cells connected to different reference output lines.

* * * * *